(12) United States Patent
Kim et al.

(10) Patent No.: US 10,289,812 B2
(45) Date of Patent: May 14, 2019

(54) APPARATUS, SYSTEM, AND METHOD OF PREVENTING FORGERY OR FALSIFICATION OF ELECTRONIC DOCUMENT BASED ON CONTENT

(71) Applicant: MARKANY INC., Seoul (KR)

(72) Inventors: Dong-Hwa Kim, Anyang-si (KR); Yong-Chan Ahn, Seoul (KR); Ki-Soo Park, Seongnam-si (KR)

(73) Assignee: MARKANY INC., Seoul (KR)

( * ) Notice: Subject to any disclaimer, the term of this patent is extended or adjusted under 35 U.S.C. 154(b) by 0 days.

(21) Appl. No.: 15/563,537

(22) PCT Filed: Sep. 7, 2017

(86) PCT No.: PCT/KR2017/009785
§ 371 (c)(1),
(2) Date: Sep. 29, 2017

(87) PCT Pub. No.: WO2018/070667
PCT Pub. Date: Apr. 19, 2018

(65) Prior Publication Data
US 2018/0349567 A1    Dec. 6, 2018

(30) Foreign Application Priority Data

Oct. 13, 2016  (KR) .......................... 10-2016-0132927

(51) Int. Cl.
*G06F 21/10* (2013.01)
*H04L 9/32* (2006.01)
(Continued)

(52) U.S. Cl.
CPC .............. *G06F 21/10* (2013.01); *G06F 17/21* (2013.01); *G06F 21/602* (2013.01); *G06F 21/64* (2013.01);
(Continued)

(58) Field of Classification Search
CPC ........ G06F 21/10; G06F 21/602; G06F 21/64; G06F 2221/0724; G06K 19/06037; H04L 9/3247
(Continued)

(56) References Cited

U.S. PATENT DOCUMENTS

| 6,940,995 B2* | 9/2005 | Choi ........................ G06F 21/64 283/72 |
| 2007/0013961 A1* | 1/2007 | Hesse ................ H04N 1/00875 358/403 |
| 2010/0067807 A1* | 3/2010 | Kim ..................... G07D 7/0047 382/218 |

FOREIGN PATENT DOCUMENTS

| KR | 10-0392813 B1 | 7/2003 |
| KR | 10-2005-0102306 A1 | 10/2005 |

(Continued)

*Primary Examiner* — Baotran N To
(74) *Attorney, Agent, or Firm* — Lucas & Mercanti, LLP

(57) ABSTRACT

The present invention includes: an electronic document receiving unit receiving an original electronic document; a text information extracting unit extracting text and text location information by analyzing content of the original electronic document; an image information extracting unit extracting an image and image location information by analyzing the content; a verification data generating unit generating original forgery falsification verification data by using at least one of the text and the text location information, the image and the image location information; and a secure electronic document generating unit generating a secure original electronic document after encrypting and inserting the original forgery falsification verification data in a preset position of the original electronic document. According to the present invention, a location of forged or falsified content can be indicated and identified with integrity verification of an electronic document file, whereby forgery or falsification can be effectively prevented.

21 Claims, 4 Drawing Sheets

(51) Int. Cl.
*G06F 21/60* (2013.01)
*G06K 19/06* (2006.01)
*G06F 21/64* (2013.01)
*G06F 17/21* (2006.01)
*G06Q 50/10* (2012.01)
*H04L 12/22* (2006.01)

(52) U.S. Cl.
CPC ....... *G06K 19/06037* (2013.01); *G06Q 50/10* (2013.01); *H04L 9/3247* (2013.01); *H04L 12/22* (2013.01); *G06F 2221/0724* (2013.01)

(58) Field of Classification Search
USPC ........................................................ 713/716
See application file for complete search history.

(56) References Cited

FOREIGN PATENT DOCUMENTS

| | | | |
|---|---|---|---|
| KR | 10-2008-0048159 | A1 | 9/2009 |
| KR | 10-2009-0100045 | A1 | 9/2009 |

\* cited by examiner

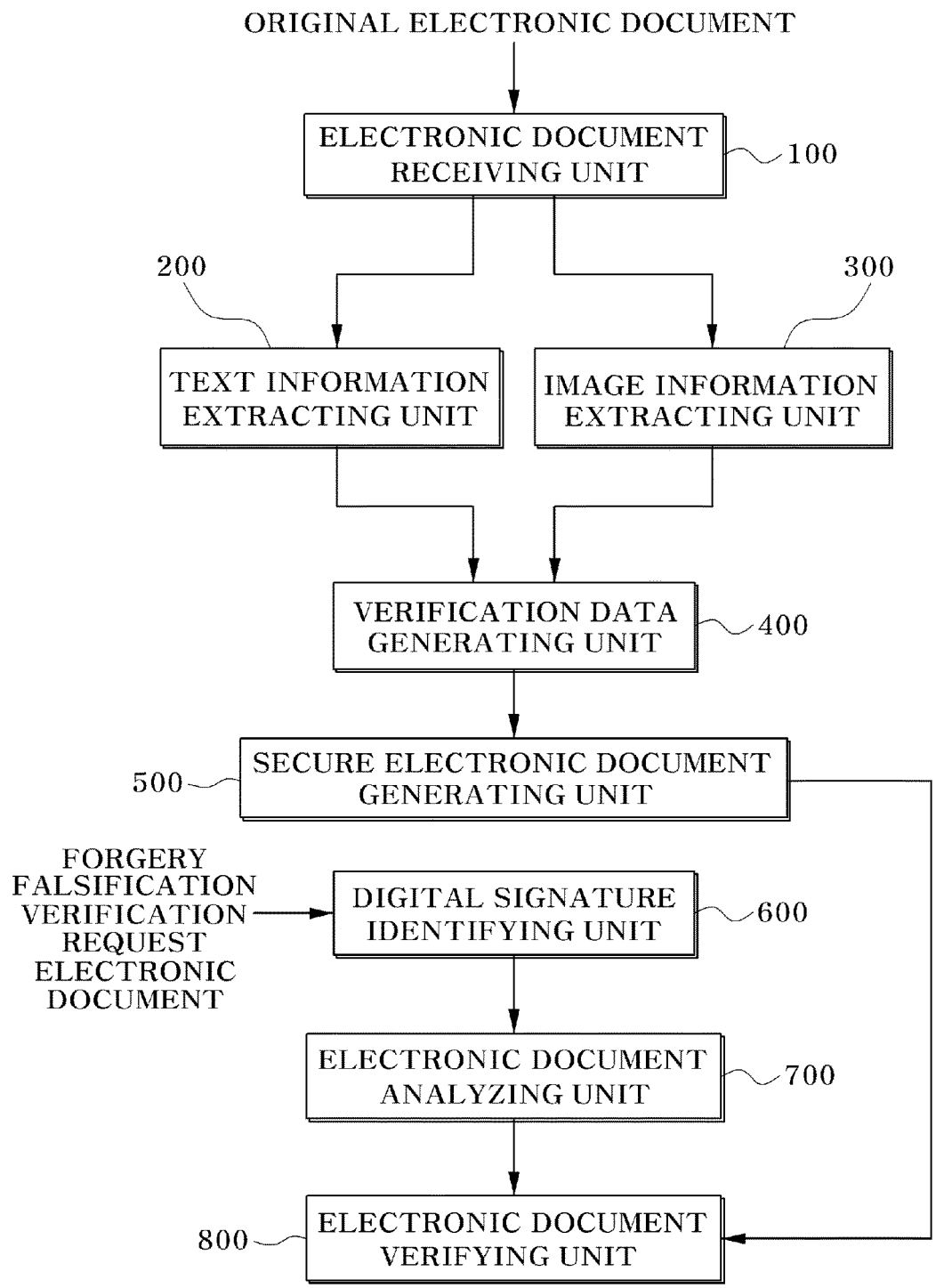

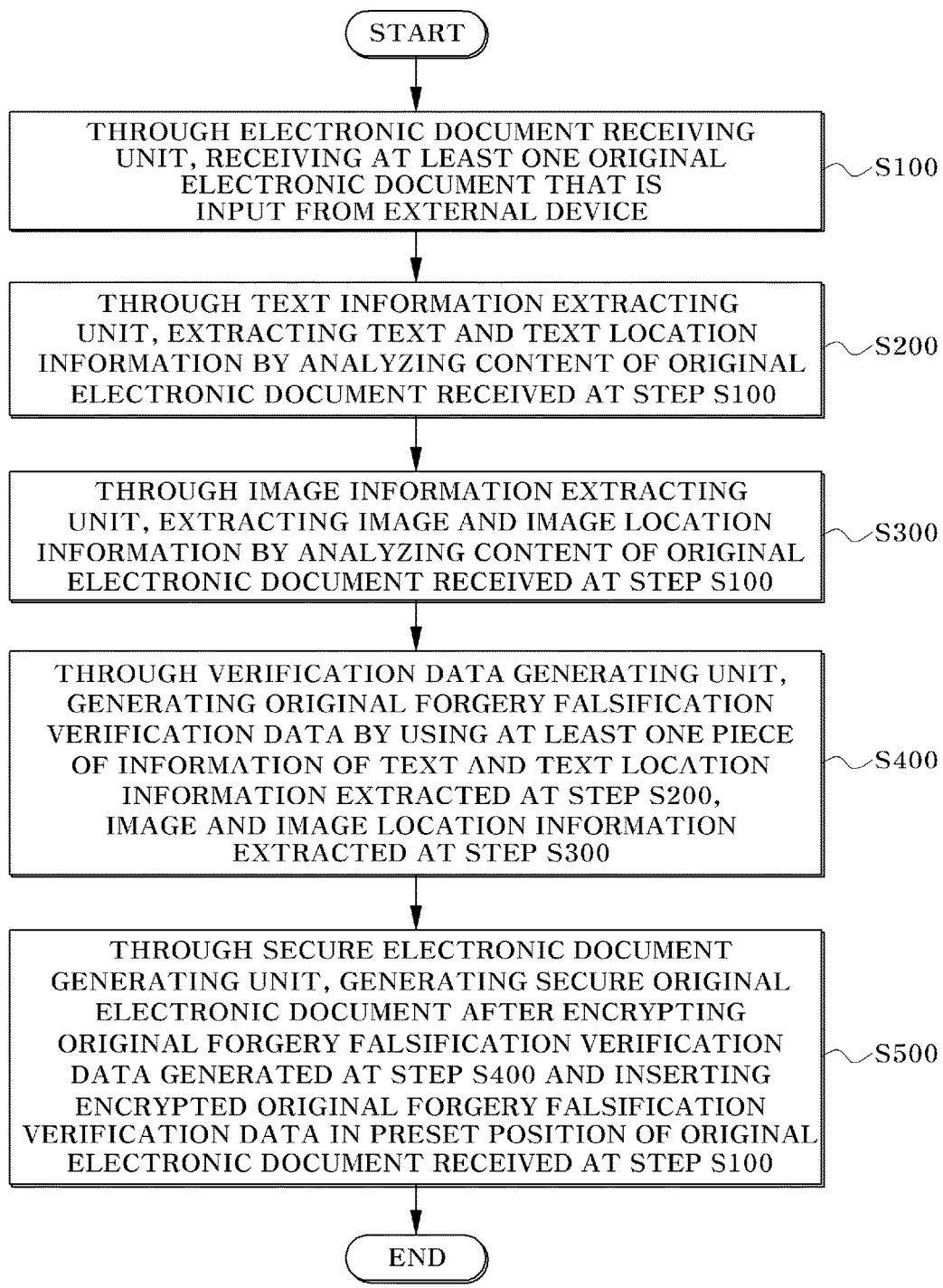

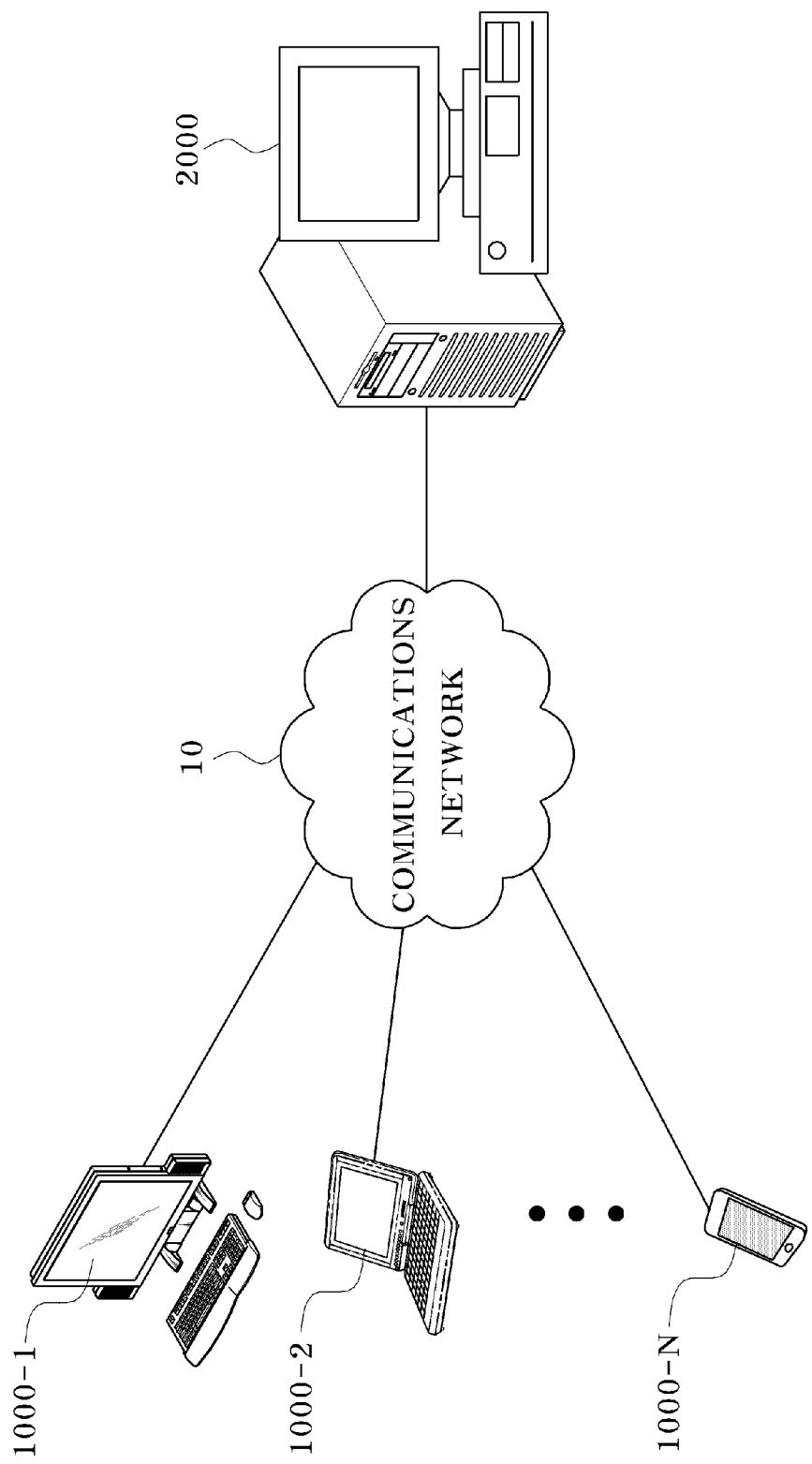

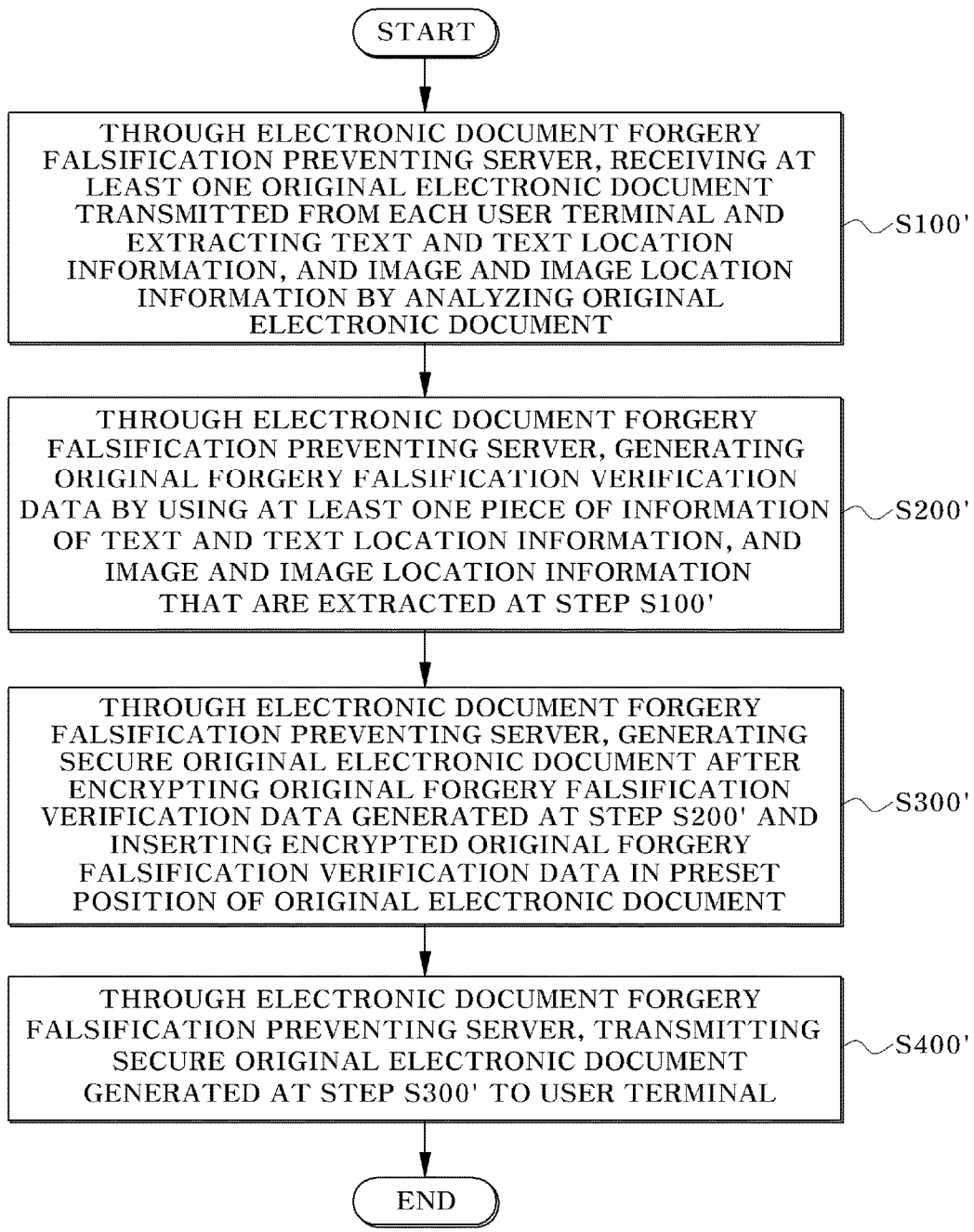

APPARATUS, SYSTEM, AND METHOD OF PREVENTING FORGERY OR FALSIFICATION OF ELECTRONIC DOCUMENT BASED ON CONTENT

CROSS-REFERENCE TO RELATED APPLICATIONS

This application is a 371 of PCT/KR2017/009785, filed on Sep. 7, 2017, which claims the benefit of Korean Patent Application No. 10-2016-0132927 filed Oct. 13, 2016, the contents of each of which are incorporated herein by reference.

TECHNICAL FIELD

The present invention relates to an apparatus, system, and method of preventing forgery or falsification of an electronic document based on content that can identify a location of forged or falsified content of the electronic document.

BACKGROUND ART

Generally, an electronic document such as a Hancom Hangul file, an MS Word file, an Adobe PDF file, etc. is a document written with a computer, etc. and composed of digital information. Unlike conventional documents composed of paper, the electronic document can be quickly transmitted through a data communication network, the internet network, etc. Thus, the use of the electronic document is rapidly increasing due to development in computer-based communication technology.

However, the electronic document is transmitted as digital signals through a communications network and thus security of the document is poor. Therefore, as one method of enhancing reliability of the electronic document, a method of attaching a digital signature is used.

A digital signature is a seal, a signature, or a cipher-form signature composed of digital information verifying a person who sends an electronic document or digital data (or a message). Also, the digital signature may be used to guarantee that original content of the transmitted electronic document or digital data is not falsified. Therefore, a user attaches the digital signature composed of digital information to the electronic document or the digital data instead of putting a seal or a signature on a document.

That is, in online contracts, electronic transactions requiring an electronic seal, etc., a digital signature may be used to certify a relevant electronic document or digital data. Recently, the digital signature has been actively used as a means of assuring reliability of electronic transactions with legal effect.

Also, a digital signature is performed by a signer in an electronic document or in a service such as electronic contracts, or electronic offers, etc. on the web. In a digital signature, a digital certificate may be used to certify the digital signature. The digital certificate is a certificate issued by national authorized institutions, and identifies a signer or identifies that the digital signature of the signer is authentic.

An additional benefit that can be obtained by using the digital signature as described above is that the digital signature can be easily transmitted; the digital signature cannot be easily denied; the digital signature cannot be forged; and a timestamp may be automatically maintained. Regardless of whether or not the digital signature is encrypted, the digital signature may be used in any kinds of electronic documents or digital data. Therefore, a receiver may trust that the electronic document or the digital data is intactly transmitted without being falsified and identity of a sender.

Recently, as computer-based crime technology has become more sophisticated, it is impossible to identify falsification or forgery of an electronic document and/or digital signature through a communications network in transmission process of the electronic document. Thus, the digital signature is not able to fulfill its original purpose.

In the meantime, in conventional verification of forgery or falsification of an electronic document, only file integrity can be identified by comparing hash values of an electronic document file. When the electronic document is forged or falsified, it is required to visually compare an original electronic document file with a verification target electronic document or with a forged or falsified electronic document file by being presented to a viewer or being printed in order to identify the location of forged or falsified content of the electronic document.

Moreover, forgery or falsification of the electronic document file means that the content of the electronic document is different from the original. Accordingly, it is extremely important to identify what is different from the original, and the location of the changed content. Thus, it is necessary to indicate and identify the forgery falsification location with integrity verification of the electronic document file.

DISCLOSURE

Technical Problem

Accordingly, the present invention has been made keeping in mind the above problems, and an object of the present invention is to provide an apparatus, system, and method of preventing forgery or falsification of an electronic document based on content, wherein the apparatus, system, and method generate electronic document forgery falsification verification information including information for identifying a location of forged or falsified content of the electronic document as encrypted data or a two-dimensional barcode, and insert the encrypted data or the two-dimensional barcode in a particular position of an original electronic document in order to indicate and identify the location of the forged or falsified content with integrity verification of an electronic document file, whereby forgery or falsification of the electronic document can be effectively prevented.

Technical Solution

In order to accomplish the above object, a first aspect of the present invention provides an apparatus for preventing forgery or falsification of an electronic document based on content, the apparatus including: an electronic document receiving unit receiving at least one original electronic document; a text information extracting unit extracting text and text location information by analyzing content of the original electronic document received from the electronic document receiving unit; an image information extracting unit extracting an image and image location information by analyzing the content of the original electronic document received from the electronic document receiving unit; a verification data generating unit generating original forgery falsification verification data by using at least one piece of information of the text and the text location information extracted by the text information extracting unit, and the image and the image location information extracted by the image information extracting unit; and a secure electronic document generating unit generating a secure original electronic document after encrypting the original forgery falsification verification data generated by the verification data generating unit and inserting the encrypted original forgery falsification verification data in a preset position of the original electronic document.

Here, preferably, when the image information extracting unit extracts the image by analyzing the content of the original electronic document received from the electronic document receiving unit, hash information of the image may be also extracted.

Preferably, when the secure electronic document generating unit encrypts the original forgery falsification verification data generated by the verification data generating unit, the generated original forgery falsification verification data may be compressed and encrypted.

Preferably, when the secure electronic document generating unit inserts the encrypted original forgery falsification verification data in the preset position of the original electronic document, the encrypted original forgery falsification verification data may be encoded and inserted in the preset position of the original electronic document.

Preferably, the secure electronic document generating unit may insert the encrypted original forgery falsification verification data in an invisible area of the original electronic document.

Preferably, when the secure electronic document generating unit applies a digital signature to the generated secure original electronic document, the digital signature that is preset may be inserted in the generated secure original electronic document so as to generate a final secure original electronic document.

Preferably, the apparatus may include a page information extracting unit extracting individual-page hash value information by analyzing individual-page information of the original electronic document received from the electronic document receiving unit, wherein the verification data generating unit may generate the original forgery falsification verification data by using at least one piece of information of the text and the text location information extracted by the text information extracting unit, the image and the image location information extracted by the image information extracting unit, and the individual-page hash value information extracted by the page information extracting unit.

Preferably, the apparatus may include: a digital signature identifying unit identifying whether a digital signature for a forgery falsification verification request electronic document is used; an electronic document analyzing unit extracting text and text location information, and an image and image location information by analyzing content of the forgery falsification verification request electronic document, and generating forgery falsification verification data by using at least one piece of information of the text and the text location information, and the image and the image location information that are extracted, when the digital signature identifying unit identifies that verification of the digital signature for the forgery falsification verification request electronic document fails or that the digital signature is unused; and an electronic document verifying unit receiving the secure original electronic document relevant to the forgery falsification verification request electronic document from the secure electronic document generating unit so as to decode the original forgery falsification verification data encrypted in the secure original electronic document, and next indicating a forgery falsification location in the forgery falsification verification request electronic document, when the decoded original forgery falsification verification data is different from the forgery falsification verification data generated by the electronic document analyzing unit.

Preferably, when the digital signature identifying unit identifies that verification of the digital signature for the forgery falsification verification request electronic document fails or that the digital signature is unused, the electronic document analyzing unit may extract individual-page hash value information by analyzing individual-page information of the forgery falsification verification request electronic document, may extract the text and the text location information, and the image and the image location information by analyzing the content of the forgery falsification verification request electronic document, and may generate the forgery falsification verification data by using at least one piece of information of the text and the text location information, the image and the image location information, and the individual-page hash value information that are extracted. The electronic document verifying unit may receive the secure original electronic document relevant to the forgery falsification verification request electronic document from the secure electronic document generating unit so as to decode the original forgery falsification verification data encrypted in the secure original electronic document. Next, when the decoded original forgery falsification verification data is different from the individual-page hash value information of the forgery falsification verification data generated by the electronic document analyzing unit, the electronic document verifying unit may determine whether the decoded original forgery falsification verification data is same as the text and the text location information, and the image and the image location information of the forgery falsification verification data generated by the electronic document analyzing unit. When the decoded original forgery falsification verification data is different from the text and the text location information, and the image and the image location information of the forgery falsification verification data generated by the electronic document analyzing unit, the electronic document verifying unit may indicate the forgery falsification location in the forgery falsification verification request electronic document.

A second aspect of the present invention provides an apparatus for preventing forgery or falsification of an electronic document based on content, the apparatus including: an electronic document receiving unit receiving at least one original electronic document; a text information extracting unit extracting text and text location information by analyzing content of the original electronic document received from the electronic document receiving unit; an image information extracting unit extracting an image and image location information by analyzing the content of the original electronic document received from the electronic document receiving unit; a verification data generating unit generating original forgery falsification verification data by using at least one piece of information of the text and the text location information extracted by the text information extracting unit, and the image and the image location information extracted by the image information extracting unit; and a secure electronic document generating unit generating a secure original electronic document after converting the original forgery falsification verification data generated by the verification data generating unit into a two-dimensional barcode and inserting the two-dimensional barcode in a preset position of the original electronic document.

Here, preferably, when the image information extracting unit extracts the image by analyzing the content of the original electronic document received from the electronic document receiving unit, hash information of the image may be also extracted.

Preferably, when the secure electronic document generating unit converts the original forgery falsification verification data generated by the verification data generating unit into the two-dimensional barcode, the generated original forgery falsification verification data may be compressed and converted into the two-dimensional barcode, or the generated original forgery falsification verification data may be compressed, encrypted, and converted into the two-dimensional barcode.

Preferably, when the secure electronic document generating unit applies a digital signature to the generated secure original electronic document, the digital signature that is preset may be inserted in the generated secure original electronic document so as to generate a final secure original electronic document.

Preferably, the apparatus may include: a page information extracting unit extracting individual-page hash value information by analyzing individual-page information of the original electronic document received from the electronic document receiving unit, wherein the verification data generating unit may generate the original forgery falsification verification data by using at least one piece of information of the text and the text location information extracted by the text information extracting unit, the image and the image location information extracted by the image information extracting unit, and the individual-page hash value information extracted by the page information extracting unit.

Preferably, the apparatus may include: a digital signature identifying unit identifying whether a digital signature for a forgery falsification verification request electronic document is used; an electronic document analyzing unit extracting text and text location information, and an image and image location information by analyzing content of the forgery falsification verification request electronic document, and generating forgery falsification verification data by using at least one piece of information of the text and the text location information, and the image and the image location information that are extracted, when the digital signature identifying unit identifies that verification of the digital signature for the forgery falsification verification request electronic document fails or that the digital signature is unused; and an electronic document verifying unit receiving the secure original electronic document relevant to the forgery falsification verification request electronic document from the secure electronic document generating unit so as to extract the original forgery falsification verification data from the two-dimensional barcode inserted in the secure original electronic document, and next indicating a forgery falsification location in the forgery falsification verification request electronic document, when the extracted original forgery falsification verification data is different from the forgery falsification verification data generated by the electronic document analyzing unit.

Preferably, when the digital signature identifying unit identifies that verification of the digital signature for the forgery falsification verification request electronic document fails or that the digital signature is unused, the electronic document analyzing unit may extract individual-page hash value information by analyzing individual-page information of the forgery falsification verification request electronic document, may extract the text and the text location information, and the image and the image location information by analyzing the content of the forgery falsification verification request electronic document, and may generate the forgery falsification verification data by using at least one piece of information of the text and the text location information, the image and the image location information, and the individual-page hash value information that are extracted. The electronic document verifying unit may receive the secure original electronic document relevant to the forgery falsification verification request electronic document from the secure electronic document generating unit so as to extract the original forgery falsification verification data from the two-dimensional barcode inserted in the secure original electronic document. Next, when the extracted original forgery falsification verification data is different from the individual-page hash value information of the forgery falsification verification data generated by the electronic document analyzing unit, the electronic document verifying unit may determine whether the extracted original forgery falsification verification data is same as the text and the text location information, and the image and the image location information of the forgery falsification verification data generated by the electronic document analyzing unit. When the extracted original forgery falsification verification data is different from the text and the text location information, and the image and the image location information of the forgery falsification verification data generated by the electronic document analyzing unit, the electronic document verifying unit may indicate the forgery falsification location in the forgery falsification verification request electronic document.

A third aspect of the present invention provides a system for preventing forgery or falsification of an electronic document based on content, the system including: at least one user terminal; and an electronic document forgery falsification preventing server generating a secure original electronic document for preventing forgery or falsification of an electronic document by analyzing content of an original electronic document received from each user terminal, wherein the electronic document forgery falsification preventing server is configured to receive at least one original electronic document transmitted from the user terminal, and extracts text and text location information, and an image and image location information by analyzing the original electronic document, generate original forgery falsification verification data by using at least one piece of information of the text and the text location information, and the image and the image location information, and generate a secure original electronic document after encrypting the generated original forgery falsification verification data and inserting the encrypted original forgery falsification verification data in a preset position of the original electronic document.

Here, preferably, the electronic document forgery falsification preventing server may provide a service of transmitting the generated secure original electronic document to the user terminal.

Preferably, when the electronic document forgery falsification preventing server extracts the image by analyzing the content of the original electronic document received from the user terminal, hash information of the image may be also extracted.

Preferably, when the electronic document forgery falsification preventing server encrypts the generated original forgery falsification verification data, the generated original forgery falsification verification data may be compressed and encrypted.

Preferably, when the electronic document forgery falsification preventing server inserts the encrypted original forgery falsification verification data in the preset position of the original electronic document, the encrypted original forgery falsification verification data may be encoded and inserted in the preset position of the original electronic document.

Preferably, the electronic document forgery falsification preventing server may insert the encrypted original forgery falsification verification data in an invisible area of the original electronic document.

Preferably, when the electronic document forgery falsification preventing server applies a digital signature to the generated secure original electronic document, the digital signature that is preset may be inserted in the generated secure original electronic document so as to generate a final secure original electronic document.

Preferably, the electronic document forgery falsification preventing server may provide a service of transmitting the generated final secure original electronic document to the user terminal.

Preferably, the electronic document forgery falsification preventing server may receive at least one original electronic document transmitted from the user terminal, may extract individual-page hash value information, the text and the text location information, and the image and the image location information by analyzing the original electronic document, and may generate the original forgery falsification verification data by using at least one piece of information of the individual-page hash value information, the text and the text location information, and the image and the image location information that are extracted.

Preferably, the electronic document forgery falsification preventing server may receive a forgery falsification verification request electronic document transmitted from the user terminal and may identify whether a digital signature for the forgery falsification verification request electronic document is used, and may extract text and text location information, and an image and image location information by analyzing content of the forgery falsification verification request electronic document, and may generate forgery falsification verification data by using at least one piece of information of the text and the text location information, and the image and the image location information that are extracted, when identifying that verification of the digital signature for the forgery falsification verification request electronic document fails or that the digital signature is unused, and may decode the original forgery falsification verification data encrypted in the secure original electronic document relevant to the forgery falsification verification request electronic document, and next, may indicate a forgery falsification location in the forgery falsification verification request electronic document and may provide a service of transmitting the forgery falsification verification request electronic document to the user terminal, when the decoded original forgery falsification verification data is different from the generated forgery falsification verification data.

Preferably, the electronic document forgery falsification preventing server may receive the forgery falsification verification request electronic document transmitted from the user terminal and may identify whether the digital signature for the forgery falsification verification request electronic document is used, may extract individual-page hash value information, the text and the text location information, and the image and the image location information by analyzing the content of the forgery falsification verification request electronic document, and may generate the forgery falsification verification data by using at least one piece of information of the individual-page hash value information, the text and the text location information, and the image and the image location information that are extracted, when identifying that verification of the digital signature for the forgery falsification verification request electronic document fails or that the digital signature is unused, and may receive the secure original electronic document relevant to the forgery falsification verification request electronic document so as to decode the original forgery falsification verification data encrypted in the secure original electronic document, and next, may determine whether the decoded original forgery falsification verification data is same as the text and the text location information, and the image and the image location information of the generated forgery falsification verification data, when the decoded original forgery falsification verification data is different from the individual-page hash value information of the generated forgery falsification verification data, and may indicate the forgery falsification location in the forgery falsification verification request electronic document and provide the service of transmitting the forgery falsification verification request electronic document to the user terminal, when the decoded original forgery falsification verification data is different from the text and the text location information, and the image and the image location information of the generated forgery falsification verification data.

A fourth aspect of the present invention provides a system for preventing forgery or falsification of an electronic document based on content, the system including: at least one user terminal; and an electronic document forgery falsification preventing server generating a secure original electronic document for preventing forgery or falsification of an electronic document by analyzing content of an original electronic document received from each user terminal, wherein the electronic document forgery falsification preventing server is configured to receive at least one original electronic document transmitted from the user terminal, and extracts text and text location information, and an image and image location information by analyzing the original electronic document, to generate original forgery falsification verification data by using at least one piece of information of the text and the text location information, and the image and the image location information, and to generate a secure original electronic document after converting the generated original forgery falsification verification data into a two-dimensional barcode and inserting the two-dimensional barcode in a preset position of the original electronic document.

Here, preferably, the electronic document forgery falsification preventing server may provide a service of transmitting the generated secure original electronic document to the user terminal.

Preferably, when the electronic document forgery falsification preventing server extracts the image by analyzing the content of the original electronic document received from the user terminal, hash information of the image may be also extracted.

Preferably, when the electronic document forgery falsification preventing server converts the generated original forgery falsification verification data into the two-dimensional barcode, the generated original forgery falsification verification data may be compressed and converted into the two-dimensional barcode, or the generated original forgery falsification verification data may be compressed, encrypted, and converted into the two-dimensional barcode.

Preferably, when the electronic document forgery falsification preventing server applies a digital signature to the generated secure original electronic document, the digital signature that is preset may be inserted in the generated secure original electronic document so as to generate a final secure original electronic document.

Preferably, the electronic document forgery falsification preventing server may provide a service of transmitting the generated final secure original electronic document to the user terminal.

Preferably, the electronic document forgery falsification preventing server may receive at least one original electronic document transmitted from the user terminal, may extract individual-page hash value information, the text and the text location information, and the image and the image location information by analyzing the original electronic document, and may generate the original forgery falsification verification data by using at least one piece of information of the individual-page hash value information, the text and the text location information, and the image and the image location information that are extracted.

Preferably, the electronic document forgery falsification preventing server may receive a forgery falsification verification request electronic document transmitted from the user terminal and may identify whether a digital signature for the forgery falsification verification request electronic document is used, and may extract text and text location information, and an image and image location information by analyzing content of the forgery falsification verification request electronic document, and may generate forgery falsification verification data by using at least one piece of information of the text and the text location information, and the image and the image location information that are extracted, when identifying that verification of the digital signature for the forgery falsification verification request electronic document fails or that the digital signature is unused, and may extract the original forgery falsification verification data from the two-dimensional barcode inserted in the secure original electronic document relevant to the forgery falsification verification request electronic document, and next, may indicate a forgery falsification location in the forgery falsification verification request electronic document and may provide a service of transmitting the forgery falsification verification request electronic document to the user terminal, when the extracted original forgery falsification verification data is different from the generated forgery falsification verification data.

Preferably, the electronic document forgery falsification preventing server may receive the forgery falsification verification request electronic document transmitted from the user terminal and may identify whether the digital signature for the forgery falsification verification request electronic document is used, and may extract individual-page hash value information, the text and the text location information, and the image and the image location information by analyzing the content of the forgery falsification verification request electronic document, and may generate the forgery falsification verification data by using at least one piece of information of the individual-page hash value information, the text and the text location information, and the image and the image location information that are extracted, when identifying that verification of the digital signature for the forgery falsification verification request electronic document fails or that the digital signature is unused, and may extract the original forgery falsification verification data from the two-dimensional barcode inserted in the secure original electronic document relevant to the forgery falsification verification request electronic document, and next, may determine whether the extracted original forgery falsification verification data is same as the text and the text location information, and the image and the image location information of the generated forgery falsification verification data, when the extracted original forgery falsification verification data is different from the individual-page hash value information of the generated forgery falsification verification data, and may indicate the forgery falsification location in the forgery falsification verification request electronic document and may provide the service of transmitting the forgery falsification verification request electronic document to the user terminal, when the extracted original forgery falsification verification data is different from the text and the text location information, and the image and the image location information of the generated forgery falsification verification data.

A fifth aspect of the present invention provides a method of preventing forgery or falsification of an electronic document based on content, the method including: (a) receiving at least one original electronic document; (b) extracting text and text location information by analyzing content of the original electronic document received at the step (a); (c) extracting an image and image location information by analyzing the content of the original electronic document received at the step (a); (d) generating original forgery falsification verification data by using at least one piece of information of the text and the text location information extracted at the step (b) and the image and the image location information extracted at the step (c); and (e) generating a secure original electronic document after encrypting the original forgery falsification verification data generated at the step (d) and inserting the encrypted original forgery falsification verification data in a preset position of the original electronic document received at the step (a).

Here, preferably, at the step (c), when extracting the image by analyzing the content of the original electronic document received at the step (a), hash information of the image may be also extracted.

Preferably, at the step (e), when encrypting the original forgery falsification verification data generated at the step (d), the original forgery falsification verification data generated at the step (d) may be compressed and encrypted.

Preferably, at the step (e), when inserting the encrypted original forgery falsification verification data in the preset position of the original electronic document, the encrypted original forgery falsification verification data may be encoded and inserted in the preset position of the original electronic document received at the step (a).

Preferably at the step (e), the encrypted original forgery falsification verification data may be inserted in an invisible area of the original electronic document received at the step (a).

Preferably, at the step (e), when a digital signature is applied to the generated secure original electronic document, the digital signature that is preset may be inserted in the generated secure original electronic document so as to generate a final secure original electronic document.

Preferably, after the step (a), the method may include: extracting individual-page hash value information by analyzing individual-page information of the original electronic document received at the step (a), wherein at the step (d), the original forgery falsification verification data may be generated by using at least one piece of information of the text and the text location information extracted at the step (b), the image and the image location information extracted at the step (c), and the extracted individual-page hash value information.

Preferably, after the step (e), the method may include: (f) receiving a forgery falsification verification request electronic document and identifying whether a digital signature for the forgery falsification verification request electronic document is used; (g) extracting text and text location information, and an image and image location information by analyzing content of the forgery falsification verification request electronic document when identifying that verification of the digital signature for the forgery falsification verification request electronic document fails or that the digital signature is unused at the step (f); (h) generating forgery falsification verification data by using at least one piece of information of the text and the text location information, and the image and the image location information that are extracted at the step (g); (i) decoding the original forgery falsification verification data encrypted in the secure original electronic document relevant to the forgery falsification verification request electronic document at the step (e); (j) comparing the original forgery falsification verification data decoded at the step (i) with the forgery falsification verification data generated at the step (h); and (k) indicating a forgery falsification location in the forgery falsification verification request electronic document received at the step (f), when the original forgery falsification verification data decoded at the step (i) is different from the forgery falsification verification data generated at the step (h) as a comparison result of the step (j).

Preferably, at the step (g), individual-page hash value information may be extracted by analyzing individual-page information of the forgery falsification verification request electronic document, and the text and the text location information, and the image and the image location information are extracted by analyzing the content of the forgery falsification verification request electronic document, when identifying that verification of the digital signature for the forgery falsification verification request electronic document fails or that the digital signature is unused at the step (f). At the step (h), the forgery falsification verification data may be generated by using at least one piece of information of the text and the text location information, and the image and the image location information, and the individual-page hash value information that are extracted at the step (g). At the step (k), when the original forgery falsification verification data decoded at the step (i) is different from the individual-page hash value information of the forgery falsification verification data generated at the step (h) as the comparison result of the step (j), whether the original forgery falsification verification data decoded at the step (i) is same as the text and the text location information, and the image and the image location information of the forgery falsification verification data generated at the step (h) may be determined. When the original forgery falsification verification data decoded at the step (i) is different from the text and the text location information, and the image and the image location information of the forgery falsification verification data generated at the step (h), the forgery falsification location may be indicated in the forgery falsification verification request electronic document.

A sixth aspect of the present invention provides a method of preventing forgery or falsification of an electronic document based on content, the method including: (a') receiving at least one original electronic document; (b') extracting text and text location information by analyzing content of the original electronic document received at the step (a'); (c') extracting an image and image location information by analyzing the content of the original electronic document received at the step (a'); (d') generating original forgery falsification verification data by using at least one piece of information of the text and the text location information extracted at the step (b'), and the image and the image location information extracted at the step (c'); and (e') generating a secure original electronic document after converting the original forgery falsification verification data generated at the step (d') into a two-dimensional barcode and inserting the two-dimensional barcode in a preset position of the original electronic document.

Here, preferably, at the step (c'), when extracting the image by analyzing the content of the original electronic document received at the step (a'), hash information of the image may be also extracted.

Preferably, at the step (e'), when converting the original forgery falsification verification data generated at the step (d') into the two-dimensional barcode, the original forgery falsification verification data generated at the step (d') may be compressed and converted into the two-dimensional barcode, or the original forgery falsification verification data generated at the step (d') may be compressed, encrypted, and converted into the two-dimensional barcode.

Preferably, at the step (e'), when a digital signature is applied to the generated secure original electronic document, the digital signature that is preset may be inserted in the generated secure original electronic document so as to generate a final secure original electronic document.

Preferably, after the step (a'), the method may include: extracting individual-page hash value information by analyzing individual-page information of the original electronic document received at the step (a'), wherein at the step (d'), the original forgery falsification verification data may be generated by using at least one piece of information of the text and the text location information extracted at the step (b'), the image and the image location information extracted at the step (c'), and the extracted individual-page hash value information.

Preferably, after the step (e'), the method may include: (f') receiving a forgery falsification verification request electronic document and identifying whether a digital signature for the forgery falsification verification request electronic document is used; (g') extracting text and text location information, and an image and image location information by analyzing content of the forgery falsification verification request electronic document when identifying that verification of the digital signature for the forgery falsification verification request electronic document fails or that the digital signature is unused at the step (f'); (h') generating forgery falsification verification data by using at least one piece of information of the text and the text location information, and the image and the image location information that are extracted at the step (g'); (i') extracting the original forgery falsification verification data from the two-dimensional barcode inserted in the secure original electronic document relevant to the forgery falsification verification request electronic document at the step (e'); (j') comparing the original forgery falsification verification data extracted at the step (i') with the forgery falsification verification data generated at the step (h'); and (k') indicating a forgery falsification location in the forgery falsification verification request electronic document received at the step (f') when the original forgery falsification verification data extracted at the step (i') is different from the forgery falsification verification data generated at the step (h') as a comparison result of the step (j').

Preferably, at the step (g'), individual-page hash value information may be extracted by analyzing individual-page information of the forgery falsification verification request electronic document, and the text and the text location information, and the image and the image location information are extracted by analyzing the content of the forgery falsification verification request electronic document, when identifying that verification of the digital signature for the forgery falsification verification request electronic document fails or that the digital signature is unused at the step (f'). At the step (h'), the forgery falsification verification data may be generated by using at least one piece of information of the text and the text location information, and the image and the image location information, and the individual-page hash value information that are extracted at the step (g'). At the step (k'), when the original forgery falsification verification data extracted at the step (l') is different from the individual-page hash value information of the forgery falsification verification data generated at the step (h') as the comparison result of the step (j'), whether the original forgery falsification verification data extracted at the step (i') is same as the text and the text location information, and the image and the image location information of the forgery falsification verification data generated at the step (h') may be determined. When the original forgery falsification verification data extracted at the step (i') is different from the text and the text location information, and the image and the image location information of the forgery falsification verification data generated at the step (h'), the forgery falsification location may be indicated in the forgery falsification verification request electronic document.

A seventh aspect of the present invention provides a method of preventing forgery or falsification of an electronic document based on content, wherein the method uses a system including at least one user terminal and an electronic document forgery falsification preventing server that are connected to each other through a communications network, the method including: (a") receiving, through the electronic document forgery falsification preventing server, at least one original electronic document transmitted from the user terminal, and extracting text and text location information, and an image and image location information by analyzing the original electronic document; (b") generating, through the electronic document forgery falsification preventing server, original forgery falsification verification data by using at least one piece of information of the text and the text location information, and the image and the image location information that are extracted at the step (a"); and (c") generating, through the electronic document forgery falsification preventing server, a secure original electronic document after encrypting the original forgery falsification verification data generated at the step (b") and inserting the encrypted original forgery falsification verification data in a preset position of the original electronic document.

Here, preferably, after the step (c"), the method may include transmitting, through the electronic document forgery falsification preventing server, the secure original electronic document generated at the step (c") to the user terminal.

Preferably, at the step (a"), when extracting the image by analyzing content of the original electronic document received from the user terminal through the electronic document forgery falsification preventing server, hash information of the image may be also extracted.

Preferably, at the step (c"), when encrypting the original forgery falsification verification data generated at the step (b") through the electronic document forgery falsification preventing server, the original forgery falsification verification data generated at the step (b") may be compressed and encrypted.

Preferably, at the step (c"), when inserting the encrypted original forgery falsification verification data in the preset position of the original electronic document through the electronic document forgery falsification preventing server, the encrypted original forgery falsification verification data may be encoded and inserted in the preset position of the original electronic document.

Preferably, at the step (c"), the encrypted original forgery falsification verification data may be inserted in an invisible area of the original electronic document through the electronic document forgery falsification preventing server.

Preferably, at the step (c"), when a digital signature is applied to the generated secure original electronic document through the electronic document forgery falsification preventing server, the digital signature that is preset may be inserted in the generated secure original electronic document so as to generate a final secure original electronic document.

Preferably, at the step (a"), through the electronic document forgery falsification preventing server, at least one original electronic document transmitted from the user terminal is received, and individual-page hash value information, the text and the text location information, and the image and the image location information may be extracted by analyzing the original electronic document. At the step (b"), through the electronic document forgery falsification preventing server, the original forgery falsification verification data may be generated by using at least one piece of information of the individual-page hash value information, the text and the text location information, and the image and the image location information that are extracted at the step (a").

Preferably, after the step (c"), the method may include: (e") receiving, through the electronic document forgery falsification preventing server, a forgery falsification verification request electronic document transmitted from the user terminal and identifying whether a digital signature for the forgery falsification verification request electronic document is used; (f") extracting, through the electronic document forgery falsification preventing server, text and text location information, and an image and image location information by analyzing content of the forgery falsification verification request electronic document when identifying that verification of the digital signature for the forgery falsification verification request electronic document fails or that the digital signature is unused at the step (e"); (g") generating, through the electronic document forgery falsification preventing server, forgery falsification verification data by using at least one piece of information of the text and the text location information, and the image and the image location information that are extracted at the step (f"); (h") decoding, through the electronic document forgery falsification preventing server, the original forgery falsification verification data encrypted in the secure original electronic document relevant to the forgery falsification verification request electronic document at the step (c"); (i") comparing, through the electronic document forgery falsification preventing server, the original forgery falsification verification data decoded at the step (h") with the forgery falsification verification data generated at the step (g"); and (j") indicating, through the electronic document forgery falsification preventing server, a forgery falsification location in the forgery falsification verification request electronic document received at the step (e") when the original forgery falsification verification data decoded at the step (h") is different from the forgery falsification verification data generated at the step (g") as a comparison result of the step (i"), and transmitting the forgery falsification verification request electronic document to the user terminal.

Preferably, at the step (f"), through the electronic document forgery falsification preventing server, individual-page hash value information may be extracted by analyzing individual-page information of the forgery falsification verification request electronic document, and the text and the text location information, and the image and the image location information may be extracted by analyzing the content of the forgery falsification verification request electronic document, when identifying that verification of the digital signature for the forgery falsification verification request electronic document fails or that the digital signature is unused at the step (e"). At the step (g"), through the electronic document forgery falsification preventing server, the forgery falsification verification data may be generated by using at least one piece of information of the text and the text location information, the image and the image location information, and the individual-page hash value information that are extracted at the step (f"). At the step (j"), when the original forgery falsification verification data decoded at the step (h") is different from the individual-page hash value information of the forgery falsification verification data generated at the step (g") as the comparison result of the step (i"), whether the original forgery falsification verification data decoded at the step (h") is same as the text and the text location information, and the image and the image location information of the forgery falsification verification data generated at the step (g") may be determined. When the original forgery falsification verification data decoded at the step (h") is different from the text and the text location information, and the image and the image location information of the forgery falsification verification data generated at the step (g"), the forgery falsification location may be indicated in the forgery falsification verification request electronic document and the forgery falsification verification request electronic document may be transmitted to the user terminal.

An eighth aspect of the present invention provides a method of preventing forgery or falsification of an electronic document based on content, wherein the method uses a system including at least one user terminal and an electronic document forgery falsification preventing server that are connected to each other through a communications network, the method including: (a"-1) receiving, through the electronic document forgery falsification preventing server, at least one original electronic document transmitted from the user terminal, and extracting text and text location information, and an image and image location information by analyzing the original electronic document; (b"-1) generating, through the electronic document forgery falsification preventing server, original forgery falsification verification data by using at least one piece of information of the text and the text location information, and the image and the image location information that are extracted at the step (a"-1); and (c"-1) generating, through the electronic document forgery falsification preventing server, a secure original electronic document, after converting the original forgery falsification verification data generated at the step (b"-1) into a two-dimensional barcode and inserting the two-dimensional barcode in a preset position of the original electronic document.

Here, preferably, after the step (c"-1), the method may include: transmitting, through the electronic document forgery falsification preventing server, the secure original electronic document generated at the step (c"-1) to the user terminal.

Preferably, at the step (a"-1), when extracting the image by analyzing content of the original electronic document received from the user terminal through the electronic document forgery falsification preventing server, hash information of the image may be also extracted.

Preferably, at the step (c"-1), when converting the original forgery falsification verification data generated at the step (b"-1) into the two-dimensional barcode through the electronic document forgery falsification preventing server, the original forgery falsification verification data generated at the step (b"-1) may be compressed and converted into the two-dimensional barcode, or the original forgery falsification verification data generated at the step (b"-1) may be compressed, encrypted, and converted into the two-dimensional barcode.

Preferably, at the step (c"-1), when a digital signature is applied to the generated secure original electronic document through the electronic document forgery falsification preventing server, the digital signature that is preset may be inserted in the generated secure original electronic document so as to generate a final secure original electronic document.

Preferably, at the step (a"-1), through the electronic document forgery falsification preventing server, at least one original electronic document transmitted from the user terminal may be received, and individual-page hash value information, the text and the text location information, and the image and the image location information may be extracted by analyzing the original electronic document. At the step (b"-1), through the electronic document forgery falsification preventing server, the original forgery falsification verification data may be generated by using at least one piece of information of the individual-page hash value information, the text and the text location information, and the image and the image location information that are extracted at the step (a"-1).

Preferably, after the step (c"-1), the method may include: (d"-1) receiving, through the electronic document forgery falsification preventing server, a forgery falsification verification request electronic document transmitted from the user terminal and identifying whether a digital signature for the forgery falsification verification request electronic document is used; (e"-1) extracting, through the electronic document forgery falsification preventing server, text and text location information, and an image and image location information by analyzing content of the forgery falsification verification request electronic document when identifying that verification of the digital signature for the forgery falsification verification request electronic document fails or that the digital signature is unused at the step (d"-1); (f"-1) generating, through the electronic document forgery falsification preventing server, forgery falsification verification data by using at least one piece of information of the text and the text location information, and the image and the image location information that are extracted at the step (e"-1); (g"-1) extracting, through the electronic document forgery falsification preventing server, the original forgery falsification verification data from the two-dimensional barcode inserted in the secure original electronic document relevant to the forgery falsification verification request electronic document at the step (c"-1); (h"-1) comparing, through the electronic document forgery falsification preventing server, the original forgery falsification verification data extracted at the step (g"-1) with the forgery falsification verification data generated at the step (f"-1); and (i"-1) indicating, through the electronic document forgery falsification preventing server, a forgery falsification location in the forgery falsification verification request electronic document received at the step (d"-1) when the original forgery falsification verification data extracted at the step (g"-1) is different from the forgery falsification verification data generated at the step (f"-1) as a comparison result of the step (h"-1), and transmitting the forgery falsification verification request electronic document to the user terminal.

Preferably, at the step (e"-1), through the electronic document forgery falsification preventing server, individual-page hash value information may be extracted by analyzing individual-page information of the forgery falsification verification request electronic document, and the text and the text location information, and the image and the image location information may be extracted by analyzing the content of the forgery falsification verification request electronic document, when identifying that verification of the digital signature for the forgery falsification verification request electronic document fails or that the digital signature is unused at the step (d"-1). At the step (f"-1), through the electronic document forgery falsification preventing server, the forgery falsification verification data may be generated by using at least one piece of information of the text and the text location information, the image and the image location information, and the individual-page hash value information that are extracted at the step (e"-1). At the step (i"-1), when the original forgery falsification verification data extracted at the step (g"-1) is different from the individual-page hash value information of the forgery falsification verification data generated at the step (f"-1) as the comparison result of the step (h"-1), whether the original forgery falsification verification data extracted at the step (g"-1) is same as the text and the text location information, and the image and the image location information of the forgery falsification verification data generated at the step (f"-1) may be determined, and when the original forgery falsification verification data extracted at the step (g"-1) is different from the text and the text location information, and the image and the image location information of the forgery falsification verification data generated at the step (f"-1), the forgery falsification location may be indicated in the forgery falsification verification request electronic document and the forgery falsification verification request electronic document may be transmitted to the user terminal.

A ninth aspect of the present invention provides a computer-readable recording medium having a program recorded thereon, the program enabling the method of preventing forgery or falsification of the electronic document based on content to be executed.

The method of preventing forgery or falsification of an electronic document based on content according to the present invention may be implemented as computer-readable code in the computer-readable recording medium. The computer-readable recording medium includes any type of recording devices storing data that can be read by a computer system.

For example, the computer-readable recording medium includes a ROM, a RAM, a CD-ROM, a magnetic tape, a hard disk, a floppy disk, a portable storage device, a nonvolatile memory (flash memory), and optical data storage device, etc.

Advantageous Effects

According to the apparatus, system, and method of preventing forgery or falsification of an electronic document based on content as described above, it is possible to indicate and identify a location of forged or falsified content with integrity verification of an electronic document file by generating electronic document forgery falsification verification information including information for identifying the location of the forged or falsified content of the electronic document as encrypted data or a two-dimensional barcode, and by inserting the encrypted data or the two-dimensional barcode in a particular position of the original electronic document, whereby forgery or falsification of the electronic document can be effectively prevented.

DESCRIPTION OF DRAWINGS

FIG. 1 is a block diagram for explaining an apparatus for preventing forgery or falsification of an electronic document based on content according to an embodiment of the present invention.

FIG. 2 is a flow diagram for explaining a method of preventing forgery or falsification of an electronic document based on content according to an embodiment of the present invention.

FIG. 3 is a diagram for explaining a system for preventing forgery or falsification of an electronic document based on content according to another embodiment of the present invention.

FIG. 4 is a flow diagram for explaining a method of preventing forgery or falsification of an electronic document based on content according to another embodiment of the present invention.

BEST MODE

The above-described object, features, and advantages are described in detail with reference to the accompanying drawings such that the present invention can be easily embodied by those skilled in the art to which the present invention belongs. When it is determined that the detailed description of the known art related to the present invention might obscure the gist of the present invention, the detailed description thereof will be omitted.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. The terminology used herein is for the purpose of describing particular embodiments only and is not intended to be limiting. As used herein, the singular forms "a", "an", and "the" are intended to include the plural forms as well, unless the context clearly indicates otherwise.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein should be defined based on the meaning of the terms together with the description throughout the specification.

Unless the context clearly indicates otherwise, it will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Also, the terms "~part", "module", and the like mean a unit for processing at least one function or operation and may be implemented by hardware, or by software, or by a combination of hardware and software.

Hereinafter, embodiments of the present invention will be described in detail with reference to the accompanying drawings. However, various changes to the following embodiment are possible and the scope of the present invention is not limited to the following embodiments. The embodiments of the present invention are given to provide a thorough understanding of the present invention to those skilled in the art.

A combination of each block of the accompanying block diagram and each step of the accompanying flow diagram can be performed by computer program instructions (execution engine). As these computer program instructions may be embedded with the processor of a general purpose computer, a special purpose computer, or other programmable data processing equipment, the program instructions performed by the processor of the computers or other programmable data processing equipment, can create a means of performing the functions illustrated in each block of the block diagram or in each step of the flow diagram. These computer program instructions may also be stored in a computer-usable or computer-readable memory for supporting the computers or other programmable data processing equipments to implement the functions in a specific way. Thus, the instructions stored in the computer-usable or computer-readable memory can create a manufactured item containing therein the instruction means of performing the functions illustrated in each block of the block diagram or in each step of the flow diagram.

Also, as these computer program instructions can be embedded with the computers or other programmable data processing equipment, a series of operation steps are performed on the computers and other programmable data processing equipment to create a computer-executed process such that instructions for operating the computers or other programmable data processing equipment can provide steps for executing the functions illustrated in each block of the block diagram and each step of the flow diagram.

Also, each block or each step may be a part of module, segment, or code which contains one or more practical instructions for implementing the specific logical functions. It should be noted that, in some alternative embodiments, the functions mentioned in blocks or steps can be implemented out of order. For example, a couple of blocks or steps illustrated one after another can actually be implemented either simultaneously or sometimes in reverse order depending on necessity.

FIG. 1 is a block diagram for explaining an apparatus for preventing forgery or falsification of an electronic document based on content according to an embodiment of the present invention.

Referring to FIG. 1, according to the embodiment of the present invention, the apparatus for preventing forgery or falsification of an electronic document based on content includes: an electronic document receiving unit 100, a text information extracting unit 200, an image information extracting unit 300, a verification data generating unit 400, a secure electronic document generating unit 500, etc. Also, according to the embodiment of the present invention, the apparatus for preventing forgery or falsification of the electronic document based on content may further include: a digital signature identifying unit 600, an electronic document analyzing unit 700, an electronic document verifying unit 800, etc. In the meantime, the components shown in FIG. 1 are not essential components, and thus according to the embodiment of the present invention, the apparatus for preventing forgery or falsification of the electronic document based on content may have more or fewer components that the components shown in FIG. 1.

Hereinafter, components of the apparatus for preventing forgery or falsification of the electronic document based on content according to the embodiment of the present invention will be described in detail as follows.

The electronic document receiving unit 100 performs a function of receiving at least one original electronic document that is input from an external device.

The text information extracting unit 200 performs a function of extracting text and text location information by analyzing the content of the original electronic document received from the electronic document receiving unit 100.

The image information extracting unit 300 performs a function of extracting an image (for example, pictures, drawings, etc.) and image location information by analyzing the content of the original electronic document received from the electronic document receiving unit 100.

Also, preferably, the image information extracting unit 300 also extracts hash information of the image, when extracting the image by analyzing the content of the original electronic document received from the electronic document receiving unit 100.

The verification data generating unit 400 performs a function of generating original forgery falsification verification data by using at least one piece of information of the text and the text location information extracted by the text location extracting unit 200, and the image and the image location information extracted by the image location extracting unit 300.

The secure electronic document generating unit 500 performs a function of generating a secure original electronic document after encrypting the original forgery falsification verification data generated by the verification data generating unit 400 and inserting the encrypted original forgery falsification verification data in a preset position of the original electronic document.

Also, when the secure electronic document generating unit 500 encrypts the original forgery falsification verification data generated by the verification data generating unit 400, the generated original forgery falsification verification data may be compressed and encrypted.

Also, when the secure electronic document generating unit 500 inserts the encrypted original forgery falsification verification data in the preset position of the original electronic document, the encrypted original forgery falsification verification data may be encoded and inserted in the preset position of the original electronic document.

Also, the secure electronic document generating unit 500 may insert the encrypted original forgery falsification verification data in an invisible area of the original electronic document.

Also, when the secure electronic document generating unit 500 applies a digital signature to the generated secure original electronic document, the digital signature that is preset may be inserted in the generated secure original electronic document so as to generate a final secure original electronic document.

Also, the secure electronic document generating unit 500 may perform a function of generating a secure original electronic document after converting the original forgery falsification verification data generated by the verification data generating unit 400 into a two-dimensional barcode and inserting the two-dimensional barcode in a preset position of the original electronic document.

Also, preferably, when the secure electronic document generating unit 500 converts the original forgery falsification verification data generated by the verification data generating unit 400 into the two-dimensional barcode, the generated original forgery falsification verification data is compressed and is converted into the two-dimensional barcode, or the generated original forgery falsification verification data is compressed, encrypted, and converted into the two-dimensional barcode.

The digital signature identifying unit 600 performs a function of identifying whether a digital signature for a forgery falsification verification request electronic document is used.

The electronic document analyzing unit 700 performs a function of extracting text and text location information, and an image and image location information by analyzing content of the forgery falsification verification request electronic document, and generating forgery falsification verification data by using at least one piece of information of the text and the text location information, and the image and the image location information that are extracted, when the digital signature identifying unit 600 identifies that verification of the digital signature for the forgery falsification verification request electronic document fails or that the digital signature is unused.

The electronic document verifying unit 800 performs a function of receiving the secure original electronic document relevant to the forgery falsification verification request electronic document from the secure electronic document generating unit 500 so as to decode the original forgery falsification verification data encrypted in the secure original electronic document, and next indicating a forgery falsification location in the forgery falsification verification request electronic document, when the decoded original forgery falsification verification data is different from the forgery falsification verification data generated by the electronic document analyzing unit 700.

Also, the electronic document verifying unit 800 may perform a function of receiving the secure original electronic document relevant to the forgery falsification verification request electronic document from the secure electronic document generating unit 500 so as to extract the original forgery falsification verification data from the two-dimensional barcode inserted in the secure original electronic document, and next indicating a forgery falsification location in the forgery falsification verification request electronic document, when the extracted original forgery falsification verification data is different from the forgery falsification verification data generated by the electronic document analyzing unit 700.

In addition, the apparatus may further include a page information extracting unit (not shown) extracting individual-page hash value information by analyzing individual-page information of the original electronic document received from the electronic document receiving unit 100.

Here, the verification data generating unit 400 may generate the original forgery falsification verification data by using at least one piece of information of the text and the text location information extracted by the text information extracting unit 200, the image and the image location information extracted by the image information extracting unit 300, and the individual-page hash value information extracted by the page information extracting unit.

Also, when the digital signature identifying unit 600 identifies that verification of the digital signature for the forgery falsification verification request electronic document fails or that the digital signature is unused, the electronic document analyzing unit 700 may extract individual-page hash value information by analyzing individual-page information of the forgery falsification verification request electronic document, and may extract the text and the text location information, and the image and the image location information by analyzing the content of the forgery falsification verification request electronic document.

Also, the electronic document analyzing unit 700 may generate the forgery falsification verification data by using at least one piece of information of the text and the text location information, the image and the image location information, and the individual-page hash value information that are extracted.

Also, the electronic document verifying unit 800 receives the secure original electronic document relevant to the forgery falsification verification request electronic document from the secure electronic document generating unit 500 so as to decode the original forgery falsification verification data encrypted in the secure original electronic document. Next, when the decoded original forgery falsification verification data is different from the individual-page hash value information of the forgery falsification verification data generated by the electronic document analyzing unit 700, the electronic document verifying unit 800 may perform a function of determining whether the decoded original forgery falsification verification data is same as the text and the text location information, and the image and the image location information of the forgery falsification verification data generated by the electronic document analyzing unit 700.

Also, the electronic document verifying unit 800 receives the secure original electronic document relevant to the forgery falsification verification request electronic document from the secure electronic document generating unit 500 so as to extract the original forgery falsification verification data from the two-dimensional barcode inserted in the secure original electronic document. Next when the extracted original forgery falsification verification data is different from the individual-page hash value information of the forgery falsification verification data generated by the electronic document analyzing unit 700, the electronic document verifying unit 800 may perform a function of determining whether the extracted original forgery falsification verification data is same as the text and the text location information, and the image and the image location information of the forgery falsification verification data generated by the electronic document analyzing unit 700.

Here, the electronic document verifying unit 800 compares the decoded original forgery falsification verification data with the individual-page hash value information of the forgery falsification verification data generated by the electronic document analyzing unit 700. Next, with regard to the different page, the electronic document verifying unit 800 may compare the decoded original forgery falsification verification data with the text and the text location information, and the image and the image location information of the forgery falsification verification data generated by the electronic document analyzing unit 700.

Also, while the electronic document verifying unit 800 compares the decoded original forgery falsification verification data with the individual-page hash value information of the forgery falsification verification data generated by the electronic document analyzing unit 700, the electronic document verifying unit 800 may compare the decoded original forgery falsification verification data with the text and the text location information, and the image and the image location information of the forgery falsification verification data generated by the electronic document analyzing unit 700, with regard to the different page.

Also, when the decoded original forgery falsification verification data is different from the text and the text location information, and the image and the image location information of the forgery falsification verification data generated by the electronic document analyzing unit 700, the electronic document verifying unit 800 may indicate the forgery falsification location in the forgery falsification verification request electronic document.

Also, when the extracted original forgery falsification verification data is different from the text and the text location information, and the image and the image location information of the forgery falsification verification data generated by the electronic document analyzing unit 700, the electronic document verifying unit 800 may indicate the forgery falsification location in the forgery falsification verification request electronic document.

The various embodiments described herein may be implemented in a recording medium that can be read by a computer or similar device by using, for example, software, hardware, or a combination thereof.

With hardware implementation, embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units which may perform functions.

With software implementation, embodiments such as procedures or functions may be implemented together with separate software modules allowing at least one function or operation to be performed. A software code may be implemented by a software application written in an appropriate programming language. Also, the software code may be stored in a storage module (not shown).

Hereinafter, the method of preventing forgery or falsification of the electronic document based on content according to an embodiment of the present invention will be described in detail.

FIG. 2 is a flow diagram for explaining a method of preventing forgery or falsification of an electronic document based on content according to an embodiment of the present invention.

Referring to FIGS. 1 and 2, first, through the electronic document receiving unit 100, at least one original electronic document that is input from an external device is received at step S100.

Next, through the text information extracting unit 200, text and text location information are extracted at step S200 by analyzing content of the original electronic document received at step S100.

Next, through the image information extracting unit 300, an image and image location information are extracted at step S300 by analyzing the content of the original electronic document received at step S100.

Here, at step S300, when extracting the image by analyzing the content of the original electronic document received at step S100, preferably, hash information of the image is also extracted.

Next, through the verification data generating unit 400, original forgery falsification verification data is generated at step S400 by using at least one piece of information of the text and the text location information extracted at step S200, and the image and the image location information extracted at step S300.

Next, through the secure electronic document generating unit 500, a secure original electronic document is generated at step S500 after encrypting the original forgery falsification verification data generated at step S400 and inserting the encrypted original forgery falsification verification data in a preset position of the original electronic document received at step S100.

Here, at step S500, when encrypting the original forgery falsification verification data generated at step S400, preferably, the original forgery falsification verification data generated at step S400 is compressed and is encrypted.

Also, at step S500, when inserting the encrypted original forgery falsification verification data in the preset position of the original electronic document, the encrypted original forgery falsification data may be encoded and inserted in the preset position of the original electronic document received at step S100.

Also, at step S500, the encrypted original forgery falsification verification data may be inserted in an invisible area of the original electronic document received at step S100.

Also, at step S500, when applying a digital signature to the generated secure original electronic document, the digital signature that is preset may be inserted in the generated secure original electronic document so as to generate a final secure original electronic document.

In the meantime, after step S400 or at step S500, through the secure electronic document generating unit 500, the secure original electronic document may be generated after converting the original forgery falsification verification data generated at step S400 into a two-dimensional barcode and inserting the two-dimensional barcode in a preset position of the original electronic document.

Here, when converting the original forgery falsification verification data generated at step S400 into the two-dimensional barcode, the original forgery falsification verification data generated at step S400 may be compressed and converted into the two-dimensional barcode, or the original forgery falsification verification data generated at step S400 may be compressed, encrypted, and converted into the two-dimensional barcode.

Also, when the original forgery falsification verification data generated at step S400 is converted into the two-dimensional barcode and the two-dimensional barcode is inserted in the preset position of the original electronic document to generate a secure original electronic document, and a digital signature is applied to the generated secure original electronic document, the digital signature that is preset may be inserted in the generated secure original electronic document so as to generate a final secure original electronic document.

In addition, not shown in the drawings, after step S500, the method may further include: receiving, through the digital signature identifying unit 600 at step 1, a forgery falsification verification request electronic document and identifying whether a digital signature for the forgery falsification verification request electronic document is used; extracting, through the electronic document analyzing unit 700 at step 2, text and text location information, and an image and image location information by analyzing content of the forgery falsification verification request electronic document when identifying that verification of the digital signature for the forgery falsification verification request electronic document fails or that the digital signature is unused at step 1; generating, through the electronic document analyzing unit 700 at step 3, forgery falsification verification data by using at least one piece of information of the text and the text location information, and the image and the image location information that are extracted at step 2; decoding, through the electronic document verifying unit 800 at step 4, the original forgery falsification verification data encrypted in the secure original electronic document relevant to the forgery falsification verification request electronic document at step S500; comparing, through the electronic document verifying unit 800 at step 5, the original forgery falsification verification data decoded at step 4 with the forgery falsification verification data generated at step 3; and indicating, through the electronic document verifying unit 800 at step 6, a forgery falsification location in the forgery falsification verification request electronic document received at step 1 when the original forgery falsification verification data decoded at step 4 is different from the forgery falsification verification data generated at step 3 as a comparison result of step 5.

Furthermore, not shown in the drawings, after step S500, the method may further include: receiving, through the digital signature identifying unit 600 at step 1', a forgery falsification verification request electronic document and identifying whether a digital signature for the forgery falsification verification request electronic document is used; extracting, through the electronic document analyzing unit 700 at step 2', text and text location information, and an image and image location information by analyzing content of the forgery falsification verification request electronic document when identifying that verification of the digital signature for the forgery falsification verification request electronic document fails or that the digital signature is unused at step 1'; generating, through the electronic document analyzing unit 700 at step 3', forgery falsification verification data by using at least one piece of information of the text and the text location information, and the image and the image location information that are extracted at step 2'; extracting, through the electronic document verifying unit 800 at step 4', the original forgery falsification verification data from the two-dimensional barcode inserted in the secure original electronic document relevant to the forgery falsification verification request electronic document at step S500; comparing, through the electronic document verifying unit 800 at step 5', the original forgery falsification verification data extracted at step 4' with the forgery falsification verification data generated at step 3'; and indicating, through the electronic document verifying unit 800 at step 6', a forgery falsification location in the forgery falsification verification request electronic document received at step 1' when the original forgery falsification verification data extracted at step 4' is different from the forgery falsification verification data generated at step 3' as a comparison result of step 5'.

Also, not shown in the drawings, after step S100, the method may further include extracting individual-page hash value information by analyzing individual-page information of the original electronic document received at step S100.

Here, at step S400, the original forgery falsification verification data may be generated by using at least one piece of information of the text and the text location information extracted at step S200, the image and the image location information extracted at step S300, and the extracted individual-page hash value information.

Next, at step 2, individual-page hash value information may be extracted by analyzing individual-page information of the forgery falsification verification request electronic document, the text and the text location information, and the image and the image location information may be extracted by analyzing the content of the forgery falsification verification request electronic document, when identifying that verification of the digital signature for the forgery falsification verification request electronic document fails or that the digital signature is unused at step 1.

Next, at step 3, the forgery falsification verification data may be generated by using at least one piece of information of the text and the text location information, the image and the image location information, and the individual-page hash value information that are extracted at step 2.

Next, at step 6, when the original forgery falsification verification data decoded at step 4 is different from the individual-page hash value information of the forgery falsification verification data generated at step 3 as the comparison result of step 5, whether the original forgery falsification verification data decoded at step 4 is same as the text and the text location information, and the image and the image location information of the forgery falsification verification data generated at step 3 is determined, and when the original forgery falsification verification data decoded at step 4 is different from the text and the text location information, and the image and the image location information of the forgery falsification verification data generated at step 3, the forgery falsification location may be indicated in the forgery falsification verification request electronic document.

In the meantime, at step 6', when the original forgery falsification verification data extracted at step 4' is different from the individual-page hash value information of the forgery falsification verification data generated at step 3' as the comparison result of step 5', whether the original forgery falsification verification data extracted at step 4' is same as the text and the text location information, and the image and the image location information of the forgery falsification verification data generated at step 3' is determined, and when the original forgery falsification verification data extracted at step 4' is different from the text and the text location information, and the image and the image location information of the forgery falsification verification data generated at step 3', the forgery falsification location may be indicated in the forgery falsification verification request electronic document.

FIG. 3 is a diagram for explaining a system for preventing forgery or falsification of an electronic document based on content according to another embodiment of the present invention.

Referring to FIG. 3, the system for preventing forgery or falsification of an electronic document based on content according to another embodiment of the present invention includes at least one user terminal (1000-1 to 1000-N) and an electronic document forgery falsification preventing server 2000 that are connected to each other through a communications network 10.

Here, the communications network 10 is preferably composed of Ethernet, a mobile communications network, etc. The communications network 10 may be a high-speed backbone network of a large communications network being capable of performing a large-scale service, and a long-distance voice and data service, and may be the Internet or a next generation wireless network including Wi-Fi, WiGig, Wireless Broadband Internet (Wibro), World Interoperability for Microwave Access (Wimax), etc. for providing high-speed multimedia service.

The Internet means a global open computer network architecture that provides TCP/IP protocol and several services on an upper layer, namely, Hyper Text Transfer Protocol (HTTP), Telnet, File Transfer Protocol (FTP), Domain Name System (DNS), Simple Mail Transfer Protocol (SMTP), Simple Network Management Protocol (SNMP), Network File Service (NFS), Network Information Service (NIS), etc. The Internet provides an environment where each user terminal (1000-1 to 1000-N) can access the electronic document forgery falsification preventing server 2000. In the meantime, the Internet may be wired or wireless internet, and may be a core network integrated with a wired public network, a wireless mobile communication network, or a portable Internet.

When the communications network 10 is a mobile communication network, the communications network 10 may be a synchronous mobile communication network or an asynchronous mobile communication network. As an example of an asynchronous mobile communication network, there is a Wideband Code Division Multiple Access (WCDMA) communication network. In this case, not shown in the drawings, the mobile communication network may include a Radio Network Controller (RNC). In the meantime, although WCDMA network is disclosed as an example, it is possible to use next generation communication networks such as 3G LTE network, 4G network, 5G network, etc., and other IP networks. This communications network 10 transmits signals and data between the user terminal (1000-1 to 1000-N) and the electronic document forgery falsification preventing server 2000.

In addition, the user terminal (1000-1 to 1000-N) transmits at least one original electronic document to the electronic document forgery falsification preventing server 2000 in order to prevent forgery or falsification of at least one original electronic document that is generated by a user.

Also, the user terminal (1000-1 to 1000-N) performs a function of transmitting at least one forgery falsification verification request electronic document for requesting forgery falsification verification to the electronic document forgery falsification preventing server 2000.

Also, the user terminal (1000-1 to 1000-N) performs a function of receiving the secure original electronic document transmitted from the electronic document forgery falsification preventing server 2000 and displaying the secure original electronic document on a display module (not shown) or storing the secure original electronic document in a storage module (not shown).

Also, the user terminal (1000-1 to 1000-N) performs a function of receiving a forgery falsification verification request electronic document where the forgery falsification location is indicated from electronic document forgery falsification preventing server 2000 and displaying the forgery falsification verification request electronic document on a display module (not shown) or storing the forgery falsification verification request electronic document in a storage module (not shown).

In the meantime, the storage module may include at least one type of readable storage medium of, for example, a flash memory type, a hard disk type, a multimedia card micro type, a card type memory (for example, SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk.

The display module may include at least one of, for example, a liquid crystal display (LCD), a light emitting diode (LED) display, a thin film transistor-liquid crystal display (TFT LCD), an organic light emitting diode (OLED) display, a flexible display, a plasma display panel (PDP), Alternate lighting of surfaces (ALiS), Digital Light Processing (DLP), Liquid crystal on silicon (LCoS), a surface-conduction electron-emitter display (SED), a field emission display (FED), a laser TV (quantum dot laser, liquid crystal laser), a ferroelectric liquid crystal display (FLD), an interferometric modulator display (iMoD), a thick-film dielectric electroluminescent (TDEL), a quantum dot display (QD-LED), a telescopic pixel display (TPD), an organic light-emitting transistor (OLET), a laser phosphor display (LPD), and a 3D display, without being limited thereto. The display module may include anything that can display an electronic document.

The user terminal (100-1 to 100-N) is preferably a common personal computer (PC) or a notebook PC, but it is not limited thereto. The user terminal may be a mobile terminal device of at least one of a smart phone, a smart pad, or a smart note communicating via wireless Internet or portable Internet. Also, the user terminal may mean all wired/wireless home appliances/communication devices having the user interface for accessing electronic document forgery falsification preventing server 2000, for example, a palm PC, a mobile play-station, a digital multimedia broadcasting (DMB) phone having a communication function, a tablet PC, iPad, etc.

Also, the electronic document forgery falsification preventing server 2000 performs a function of generating a secure original electronic document for preventing forgery or falsification of an electronic document by analyzing content of an original electronic document transmitted from each user terminal (1000-1 to 1000-N).

Also, the electronic document forgery falsification preventing server 2000 performs a function of receiving at least one original electronic document transmitted from each user terminal (1000-1 to 1000-N) and extracting text and text location information, and an image and image location information by analyzing the original electronic document, and generating original forgery falsification verification data by using at least one piece of information of the text and the text location information, and the image and the image location information that are extracted.

Also, the electronic document forgery falsification preventing server 2000 may perform a function of receiving at least one original electronic document transmitted from each user terminal (1000-1 to 1000-N) and extracting individual-page hash value information, text and text location information, and an image and image location information by analyzing the original electronic document, and generating original forgery falsification verification data by using at least one piece of information of the individual-page hash value information, the text and the text location information, and the image and the image location information that are extracted.

Also, the electronic document forgery falsification preventing server 2000 performs a function of generating a secure original electronic document after encrypting the generated original forgery falsification verification data and inserting the encrypted original forgery falsification verification data in a preset position of the original electronic document.

Here, the electronic document forgery falsification preventing server 2000 may perform a function of storing the generated secure original electronic document in a database (DB) server (not shown), or providing a service of transmitting the generated secure original electronic document to the user terminal (1000-1 to 1000-N).

In the meantime, through the electronic document forgery falsification preventing server 2000, the generated secure original electronic document may be provided to an external terminal (not shown) or the user terminal (1000-1 to 1000-N) via a web server (not shown).

Also, when the electronic document forgery falsification preventing server 2000 extracts the image by analyzing the content of the original electronic document received from the user terminal (1000-1 to 1000-N), preferably, hash information of the image is also extracted.

Also, when the electronic document forgery falsification preventing server 2000 encrypts the generated original forgery falsification verification data, the generated original forgery falsification verification data is compressed and encrypted.

Also, when the electronic document forgery falsification preventing server 2000 inserts the encrypted original forgery falsification verification data in the preset position of the original electronic document, the encrypted original forgery falsification verification data is encoded and inserted in the preset position of the original electronic document.

Also, the electronic document forgery falsification preventing server 2000 may insert the encrypted original forgery falsification verification data in an invisible area of the original electronic document.

Also, when the electronic document forgery falsification preventing server 2000 applies a digital signature to the generated secure original electronic document, the digital signature that is preset may be inserted in the generated secure original electronic document so as to generate a final secure original electronic document.

Here, the electronic document forgery falsification preventing server 2000 may store the generated final secure original electronic document in a database (DB) server (not shown), or may provide a service of transmitting the generated final secure original electronic document to the user terminal (1000-1 to 1000-N).

In the meantime, through the electronic document forgery falsification preventing server 2000 the generated final secure original electronic document may be provided to an external terminal (not shown) or the user terminal (1000-1 to 1000-N) via a web server (not shown).

Also, the electronic document forgery falsification preventing server 2000 may perform a function of receiving a forgery falsification verification request electronic document transmitted from the user terminal (1000-1 to 1000-N) and identifying whether the digital signature for the forgery falsification verification request electronic document is used.

Also, when identifying that verification of the digital signature for the forgery falsification verification request electronic document fails or that the digital signature is unused, the electronic document forgery falsification preventing server 2000 may perform a function of extracting text and text location information, and an image and image location information by analyzing content of the forgery falsification verification request electronic document, and of generating forgery falsification verification data by using at least one piece of information of the text and the text location information, and the image and the image location information that are extracted.

Also, when identifying that verification of the digital signature for the forgery falsification verification request electronic document fails or that the digital signature is unused, the electronic document forgery falsification preventing server 2000 may perform a function of extracting individual-page hash value information, text and text location information, and an image and image location information by analyzing the content of the forgery falsification verification request electronic document, and of generating forgery falsification verification data by using at least one piece of information of the individual-page hash value information, the text and the text location information, and the image and the image location information that are extracted.

Also, the electronic document forgery falsification preventing server 2000 decodes the original forgery falsification verification data encrypted in the secure original electronic document relevant to the forgery falsification verification request electronic document, and next, when the decoded original forgery falsification verification data is different from the generated forgery falsification verification data, the electronic document forgery falsification preventing server 2000 may perform a function of indicating a forgery falsification location in the forgery falsification verification request electronic document.

Also, the electronic document forgery falsification preventing server 2000 receives the secure original electronic document relevant to the forgery falsification verification request electronic document from an external or its own DB and decodes the original forgery falsification verification data encrypted in the secure original electronic document. Next, when the decoded original forgery falsification verification data is different from the individual-page hash value information of the generated forgery falsification verification data, whether the decoded original forgery falsification verification data is same as the text and the text location information, and the image and the image location information of the generated forgery falsification verification data is determined. When the decoded original forgery falsification verification data is different from the text and the text location information, and the image and the image location information of the generated forgery falsification verification data, the electronic document forgery falsification preventing server 2000 may perform a function of indicating the forgery falsification location in the forgery falsification verification request electronic document.

Here, the electronic document forgery falsification preventing server 2000 may perform a function of storing the forgery falsification request electronic document where the forgery falsification location is indicated in a database (DB) server (not shown), or providing a service of transmitting the forgery falsification request electronic document to the user terminal (1000-1 to 1000-N).

In the meantime, through the electronic document forgery falsification preventing server 2000, the forgery falsification request electronic document where the forgery falsification location is indicated may be provided to an external terminal (not shown) or the user terminal (1000-1 to 1000-N) via a web server (not shown).

Also, the electronic document forgery falsification preventing server 2000 may generate a secure original electronic document after converting the generated original forgery falsification verification data into a two-dimensional barcode and inserting the two-dimensional barcode in a preset position of the original electronic document, and may provide a service of transmitting the secure original electronic document to the user terminal (1000-1 to 1000-N).

Also, when the electronic document forgery falsification preventing server 2000 converts the generated original forgery falsification verification data into the two-dimensional barcode, preferably, the generated original forgery falsification verification data is compressed and is converted into the two-dimensional barcode, or the generated original forgery falsification verification data is compressed, encrypted, and converted into the two-dimensional barcode.

Also, after extracting the original forgery falsification verification data from the two-dimensional barcode inserted in the secure original electronic document relevant to the forgery falsification verification request electronic document, when the extracted original forgery falsification verification data is different from the generated forgery falsification verification data, the electronic document forgery falsification preventing server 2000 may perform a function of indicating the forgery falsification location in the forgery falsification request electronic document.

Also, after extracting the original forgery falsification verification data from the two-dimensional barcode inserted in the secure original electronic document relevant to the forgery falsification verification request electronic document, when the extracted original forgery falsification verification data is different from the individual-page hash value information of the generated forgery falsification verification data, the electronic document forgery falsification preventing server 2000 determines whether the extracted original forgery falsification verification data is same as the text and the text location information, and the image and the image location information of the generated forgery falsification verification data. Next, when the extracted original forgery falsification verification data is different from the text and the text location information, and the image and the image location information of the generated forgery falsification verification data, the electronic document forgery falsification preventing server 2000 may perform a function of indicating the forgery falsification location in the forgery falsification verification request electronic document.

Here, the electronic document forgery falsification preventing server 2000 may perform a function of storing the forgery falsification verification request electronic document where the forgery falsification location is indicated in a database (DB) server (not shown), or providing a service of transmitting the forgery falsification verification request electronic document to the user terminal (1000-1 to 1000-N).

In the meantime, through the electronic document forgery falsification preventing server 2000, the forgery falsification verification request electronic document where the forgery falsification location is indicated may be provided to an external terminal (not shown) or the user terminal (1000-1 to 1000-N) via a web server (not shown).

Hereinafter, the method of preventing forgery or falsification of the electronic document based on content according to another embodiment of the present invention will be described in detail.

FIG. 4 is a flow diagram for explaining a method of preventing forgery or falsification of an electronic document based on content according to another embodiment of the present invention.

Referring to FIGS. 3 and 4, at step S100', through the electronic document forgery falsification preventing server 2000, at least one original electronic document transmitted from the user terminal (1000-1 to 1000-N) is received, and text and text location information, and an image and image location information are extracted by analyzing the original electronic document.

Here, at step S100', when extracting the image by analyzing content of the original electronic document received from the user terminal (1000-1 to 1000-N) through the electronic document forgery falsification preventing server 2000, preferably, hash information of the image is also extracted.

In the meantime, at step S100', through the electronic document forgery falsification preventing server 2000, at least one original electronic document transmitted from the user terminal (1000-1 to 1000-N) is received, and individual-page hash value information, the text and the text location information, and the image and the image location information are extracted by analyzing the original electronic document.

Next, at step S200', through the electronic document forgery falsification preventing server 2000, the original forgery falsification verification data is generated by using at least one piece of information of the text and the text location information, and the image and the image location information that are extracted at step S100'.

In the meantime, at step S200', through the electronic document forgery falsification preventing server 2000, the original forgery falsification verification data is generated by using at least one piece of information of the individual-page hash value information, the text and the text location information, and the image and the image location information that are extracted at step S100'.

Next, at step S300', through the electronic document forgery falsification preventing server 2000, a secure original electronic document is generated after encrypting the original forgery falsification verification data generated at step S200' and inserting the encrypted original forgery falsification verification data in a preset position of the original electronic document.

Here, at step S300', when encrypting the original forgery falsification verification data generated at step S200' through the electronic document forgery falsification preventing server 2000, preferably, the original forgery falsification verification data generated at step S200' is compressed and encrypted.

Also, at step S300', when inserting the encrypted original forgery falsification verification data in the preset position of the original electronic document through the electronic document forgery falsification preventing server 2000, the encrypted original forgery falsification verification data may be encoded and inserted in the preset position of the original electronic document.

Also, at step S300', the encrypted original forgery falsification verification data may be inserted in an invisible area of the original electronic document through the electronic document forgery falsification preventing server 2000.

Also, at step S300', when a digital signature is applied to the generated secure original electronic document through the electronic document forgery falsification preventing server 2000, the digital signature that is preset may be inserted in the generated secure original electronic document so as to generate a final secure original electronic document.

In the meantime, after step S200', through the electronic document forgery falsification preventing server 2000, a secure original electronic document may be generated after converting the original forgery falsification verification data generated at step S200' into a two-dimensional barcode and inserting the two-dimensional barcode in a preset position of the original electronic document.

Here, when converting the original forgery falsification verification data generated at step S200' into the two-dimensional barcode through the electronic document forgery falsification preventing server 2000, preferably, the original forgery falsification verification data generated at step S200' is compressed and converted into the two-dimensional barcode, or the original forgery falsification verification data generated at step S200' is compressed, encrypted, and converted into the two-dimensional barcode.

In addition, at step S400', through the electronic document forgery falsification preventing server 2000, the secure original electronic document generated at step S300' may be stored in a database server or may be transmitted to the user terminal (1000-1 to 1000-N).

Furthermore, not shown in the drawings, at step S300' or after step S400', the method may further include: receiving, through the electronic document forgery falsification preventing server 2000 at step 1-1, a forgery falsification verification request electronic document transmitted from the user terminal (1000-1 to 1000-N) and identifying whether a digital signature for the forgery falsification verification request electronic document is used; extracting, through the electronic document forgery falsification preventing server 2000 at step 2-1, text and text location information, and an image and image location information by analyzing content of the forgery falsification verification request electronic document when identifying that verification of the digital signature for the forgery falsification verification request electronic document fails or that the digital signature is unused at step 1-1; generating, through the electronic document forgery falsification preventing server 2000 at step 3-1, forgery falsification verification data by using at least one piece of information of the text and the text location information, and the image and the image location information that are extracted at step 2-1; decoding, through the electronic document forgery falsification preventing server 2000 at step 4-1, the original forgery falsification verification data encrypted in the secure original electronic document relevant to the forgery falsification verification request electronic document at step S300'; comparing, through the electronic document forgery falsification preventing server 2000 at step 5-1, the original forgery falsification verification data decoded at step 4-1 with the forgery falsification verification data generated at step 3-1; and indicating, through the electronic document forgery falsification preventing server 2000 at step 6-1, a forgery falsification location in the forgery falsification verification request electronic document received at step 1-1 and transmitting the forgery falsification verification request electronic document to the user terminal (1000-1 to 1000-N) when the original forgery falsification verification data decoded at step 4-1 is different from the forgery falsification verification data generated at step 3-1 as a comparison result of step 5-1.

Also, not shown in the drawings, at step S300' or after step S400', the method may further include: receiving, through the electronic document forgery falsification preventing server 2000 at step 1'-1, a forgery falsification verification request electronic document transmitted from the user terminal (1000-1 to 1000-N) and identifying whether a digital signature for the forgery falsification verification request electronic document is used; extracting, through the electronic document forgery falsification preventing server 2000 at step 2'-1, text and text location information, and an image and image location information by analyzing content of the forgery falsification verification request electronic document when identifying that verification of the digital signature for the forgery falsification verification request electronic document fails or that the digital signature is unused at step 1'-1; generating, through the electronic document forgery falsification preventing server 2000 at step 3'-1, forgery falsification verification data by using at least one piece of information of the text and the text location information, and the image and the image location information that are extracted at step 2'-1; extracting, through the electronic document forgery falsification preventing server 2000 at step 4'-1, the original forgery falsification verification data from the two-dimensional barcode inserted in the secure original electronic document relevant to the forgery falsification verification request electronic document at step S300'; comparing, through the electronic document forgery falsification preventing server 2000 at step 5'-1, the original forgery falsification verification data extracted at step 4'-1 with the forgery falsification verification data generated at step 3'-1; and indicating, through the electronic document forgery falsification preventing server 2000 at step 6'-1, a forgery falsification location in the forgery falsification verification request electronic document received at step 1'-1 and transmitting the forgery falsification verification request electronic document to the user terminal (1000-1 to 1000-N) when the original forgery falsification verification data extracted at step 4'-1 is different from the forgery falsification verification data generated at step 3'-1 as a comparison result of step 5'-1.

In the meantime, at step 2-1 or step 2'-1, through the electronic document forgery falsification preventing server 2000, individual-page hash value information may be extracted by analyzing individual-page information of the forgery falsification verification request electronic document, and the text and the text location information, and the image and the image location information may be extracted by analyzing the content of the forgery falsification verification request electronic document, when identifying that verification of the digital signature for the forgery falsification verification request electronic document fails or that the digital signature is unused at step 1-1 or step 1'-1.

Next, at step 3-1 or step 3'-1, through the electronic document forgery falsification preventing server 2000, the forgery falsification verification data may be generated by using at least one piece of information of the text and the text location information, the image and the image location information, and the individual-page hash value information that are extracted at step 2-1 or step 2'-1.

Next, at step 6-1, when the original forgery falsification verification data decoded at step 4-1 is different from the individual-page hash value information of the forgery falsification verification data generated at step 3-1 as the comparison result of step 5-1, whether the original forgery falsification verification data decoded at step 4-1 is same as the text and the text location information, and the image and the image location information of the forgery falsification verification data generated at step 3-1 is determined. When the original forgery falsification verification data decoded at step 4-1 is different from the text and the text location information, and the image and the image location information of the forgery falsification verification data generated at step 3-1, the forgery falsification location may be indicated in the forgery falsification verification request electronic document received at step 1-1 and the forgery falsification verification request electronic document may be transmitted to the user terminal (1000-1 to 1000-N).

In the meantime, at step 6'-1, when the original forgery falsification verification data extracted at step 4'-1 is different from the individual-page hash value information of the forgery falsification verification data generated at step 3'-1 as the comparison result of step 5'-1, whether the original forgery falsification verification data extracted at step 4'-1 is same as the text and the text location information, and the image and the image location information of the forgery falsification verification data generated at step 3'-1 is determined. When the original forgery falsification verification data extracted at step 4'-1 is different from the text and the text location information, and the image and the image location information of the forgery falsification verification data generated at step 3'-1, the forgery falsification location may be indicated in the forgery falsification verification request electronic document received at step 1'-1, and the forgery falsification verification request electronic document may be transmitted to the user terminal (1000-1 to 1000-N).

In the meantime, the method of preventing forgery or falsification of an electronic document based on content according to an embodiment of the present invention may be implemented as computer-readable code in a computer-readable recording medium. The computer-readable recording medium includes any type of recording devices storing data that can be read by a computer system.

For example, the computer-readable recording medium includes a ROM, a RAM, a CD-ROM, a magnetic tape, a hard disk, a floppy disk, a portable storage device, a non-volatile memory (flash memory), and optical data storage device, etc.

Also, the computer-readable recording medium is distributed to computer systems via a computer communications network, and may be stored and executed as code can be read in a distributed manner.

Although the preferred embodiments of the apparatus, system, and method of preventing forgery or falsification of an electronic document based on content have been described above, the scope of the present invention is not limited to the embodiments and various modifications are possible, without departing from the scope of the accompanying claims, the detailed description of the invention, and the accompanying drawings.

INDUSTRIAL APPLICABILITY

The present invention may be widely used in identifying a location of forged or falsified content of an electronic document.

The invention claimed is:

1. An apparatus for preventing forgery or falsification of an electronic document based on content, the apparatus comprising:
   an electronic document receiving unit receiving at least one original electronic document;
   a text information extracting unit extracting text and text location information by analyzing content of the original electronic document received from the electronic document receiving unit;
   an image information extracting unit extracting an image and image location information by analyzing the content of the original electronic document received from the electronic document receiving unit;
   a verification data generating unit generating original forgery falsification verification data by using at least one piece of information of the text and the text location information extracted by the text information extracting unit, and the image and the image location information extracted by the image information extracting unit;
   a secure electronic document generating unit generating a secure original electronic document after encrypting the original forgery falsification verification data generated by the verification data generating unit and inserting the encrypted original forgery falsification verification data in a preset position of the original electronic document;
   a digital signature identifying unit identifying whether a digital signature for a forgery falsification verification request electronic document is used;
   an electronic document analyzing unit extracting text and text location information, and an image and image location information by analyzing content of the forgery falsification verification request electronic document, and generating forgery falsification verification data by using at least one piece of information of the text and the text location information, and the image and the image location information that are extracted, when the digital signature identifying unit identifies that verification of the digital signature for the forgery falsification verification request electronic document fails or that the digital signature is unused; and
   an electronic document verifying unit receiving the secure original electronic document relevant to the forgery falsification verification request electronic document from the secure electronic document generating unit so as to decode the original forgery falsification verification data encrypted in the secure original electronic document, and next indicating a forgery falsification location in the forgery falsification verification request electronic document, when the decoded original forgery falsification verification data is different from the forgery falsification verification data generated by the electronic document analyzing unit.

2. The apparatus of claim 1, wherein when the image information extracting unit extracts the image by analyzing the content of the original electronic document received from the electronic document receiving unit, hash information of the image is also extracted.

3. The apparatus of claim 1, wherein when the secure electronic document generating unit applies a digital signature to the generated secure original electronic document, the digital signature that is preset is inserted in the generated secure original electronic document so as to generate a final secure original electronic document.

4. The apparatus of claim 1, further comprising:
   a page information extracting unit extracting individual-page hash value information by analyzing individual-page information of the original electronic document received from the electronic document receiving unit,
   wherein the verification data generating unit generates the original forgery falsification verification data by using at least one piece of information of the text and the text location information extracted by the text information extracting unit, the image and the image location information extracted by the image information extracting unit, and the individual-page hash value information extracted by the page information extracting unit.

5. The apparatus of claim 1, wherein when the digital signature identifying unit identifies that verification of the digital signature for the forgery falsification verification request electronic document fails or that the digital signature is unused, the electronic document analyzing unit extracts individual-page hash value information by analyzing individual-page information of the forgery falsification verification request electronic document, extracts the text and the text location information, and the image and the image location information by analyzing the content of the forgery falsification verification request electronic document, and generates the forgery falsification verification data by using at least one piece of information of the text and the text location information, the image and the image location information, and the individual-page hash value information that are extracted, and
   the electronic document verifying unit receives the secure original electronic document relevant to the forgery falsification verification request electronic document from the secure electronic document generating unit so as to decode the original forgery falsification verification data encrypted in the secure original electronic document, and next when the decoded original forgery falsification verification data is different from the individual-page hash value information of the forgery falsification verification data generated by the electronic document analyzing unit, the electronic document verifying unit determines whether the decoded original forgery falsification verification data is same as the text and the text location information, and the image and the image location information of the forgery falsification verification data generated by the electronic document analyzing unit, and when the decoded original forgery falsification verification data is different from the text and the text location information, and the image and the image location information of the forgery falsification verification data generated by the electronic document analyzing unit, the electronic document verifying unit indicates the forgery falsification location in the forgery falsification verification request electronic document.

6. A system for preventing forgery or falsification of an electronic document based on content, the system comprising:

at least one user terminal; and an electronic document forgery falsification preventing server generating a secure original electronic document for preventing forgery or falsification of an electronic document by analyzing content of an original electronic document received from each user terminal, wherein the electronic document forgery falsification preventing server is configured to receive at least one original electronic document transmitted from the user terminal, and extracts text and text location information, and an image and image location information by analyzing the original electronic document, generate original forgery falsification verification data by using at least one piece of information of the text and the text location information, and the image and the image location information, and generate a secure original electronic document after encrypting the generated original forgery falsification verification data and inserting the encrypted original forgery falsification verification data in a preset position of the original electronic document, wherein when the electronic document forgery falsification preventing server applies a digital signature to the generated secure original electronic document, the digital signature that is preset is inserted in the generated secure original electronic document so as to generate a final secure original electronic document, and provides a service of transmitting the generated final secure original electronic document to the user terminal.

7. The system of claim 6, wherein when the electronic document forgery falsification preventing server extracts the image by analyzing the content of the original electronic document received from the user terminal, hash information of the image is also extracted.

8. The system of claim 6, wherein the electronic document forgery falsification preventing server is configured to receive at least one original electronic document transmitted from the user terminal, extract individual-page hash value information, the text and the text location information, and the image and the image location information by analyzing the original electronic document, and generate the original forgery falsification verification data by using at least one piece of information of the individual-page hash value information, the text and the text location information, and the image and the image location information that are extracted.

9. The system of claim 6, wherein the electronic document forgery falsification preventing server is configured to receive a forgery falsification verification request electronic document transmitted from the user terminal and identify whether a digital signature for the forgery falsification verification request electronic document is used, extract text and text location information, and an image and image location information by analyzing content of the forgery falsification verification request electronic document, and generate forgery falsification verification data by using at least one piece of information of the text and the text location information, and the image and the image location information that are extracted, when identifying that verification of the digital signature for the forgery falsification verification request electronic document fails or that the digital signature is unused, and decode the original forgery falsification verification data encrypted in the secure original electronic document relevant to the forgery falsification verification request electronic document, and next indicate a forgery falsification location in the forgery falsification verification request electronic document and provide a service of transmitting the forgery falsification verification request electronic document to the user terminal, when the decoded original forgery falsification verification data is different from the generated forgery falsification verification data.

10. A method of preventing forgery or falsification of an electronic document based on content, the method comprising:

(a) receiving at least one original electronic document;

(b) extracting text and text location information by analyzing content of the original electronic document received at the step (a);

(c) extracting an image and image location information by analyzing the content of the original electronic document received at the step (a);

(d) generating original forgery falsification verification data by using at least one piece of information of the text and the text location information extracted at the step (b) and the image and the image location information extracted at the step (c);

(e) generating a secure original electronic document after encrypting the original forgery falsification verification data generated at the step (d) and inserting the encrypted original forgery falsification verification data in a preset position of the original electronic document received at the step (a);

(f) receiving a forgery falsification verification request electronic document and identifying whether a digital signature for the forgery falsification verification request electronic document is used;

(g) extracting text and text location information, and an image and image location information by analyzing content of the forgery falsification verification request electronic document when identifying that verification of the digital signature for the forgery falsification verification request electronic document fails or that the digital signature is unused at the step (f);

(h) generating forgery falsification verification data by using at least one piece of information of the text and the text location information, and the image and the image location information that are extracted at the step (g);

(i) decoding the original forgery falsification verification data encrypted in the secure original electronic document relevant to the forgery falsification verification request electronic document at the step (e);

(j) comparing the original forgery falsification verification data decoded at the step (i) with the forgery falsification verification data generated at the step (h); and (k) indicating a forgery falsification location in the forgery falsification verification request electronic document received at the step (f), when the original forgery falsification verification data decoded at the step (i) is different from the forgery falsification verification data generated at the step (h) as a comparison result of the step (j).

11. The method of claim 10, wherein at the step (c), when extracting the image by analyzing the content of the original electronic document received at the step (a), hash information of the image is also extracted.

12. The method of claim 10, wherein at the step (e), when a digital signature is applied to the generated secure original electronic document, the digital signature that is preset is inserted in the generated secure original electronic document so as to generate a final secure original electronic document.

13. The method of claim 10, after the step (a), further comprising:

extracting individual-page hash value information by analyzing individual-page information of the original electronic document received at the step (a), wherein at the step (d), the original forgery falsification verification data is generated by using at least one piece of information of the text and the text location information extracted at the step (b), the image and the image location information extracted at the step (c), and the extracted individual-page hash value information.

14. The method of claim 10, wherein at the step (g), individual-page hash value information is extracted by analyzing individual-page information of the forgery falsification verification request electronic document, and the text and the text location information, and the image and the image location information are extracted by analyzing the content of the forgery falsification verification request electronic document, when identifying that verification of the digital signature for the forgery falsification verification request electronic document fails or that the digital signature is unused at the step (f);

at the step (h), the forgery falsification verification data is generated by using at least one piece of information of the text and the text location information, and the image and the image location information, and the individual-page hash value information that are extracted at the step (g);

at the step (k), when the original forgery falsification verification data decoded at the step (i) is different from the individual-page hash value information of the forgery falsification verification data generated at the step (h) as the comparison result of the step (j), whether the original forgery falsification verification data decoded at the step (i) is same as the text and the text location information, and the image and the image location information of the forgery falsification verification data generated at the step (h) is determined, and when the original forgery falsification verification data decoded at the step (i) is different from the text and the text location information, and the image and the image location information of the forgery falsification verification data generated at the step (h), the forgery falsification location is indicated in the forgery falsification verification request electronic document.

15. A method of preventing forgery or falsification of an electronic document based on content, wherein the method uses a system including at least one user terminal and an electronic document forgery falsification preventing server that are connected to each other through a communications network, the method comprising:

(a") receiving, through the electronic document forgery falsification preventing server, at least one original electronic document transmitted from the user terminal, and extracting text and text location information, and an image and image location information by analyzing the original electronic document;

(b") generating, through the electronic document forgery falsification preventing server, original forgery falsification verification data by using at least one piece of information of the text and the text location information, and the image and the image location information that are extracted at the step (a");

(c") generating, through the electronic document forgery falsification preventing server, a secure original electronic document after encrypting the original forgery falsification verification data generated at the step (b") and inserting the encrypted original forgery falsification verification data in a preset position of the original electronic document;

(d") receiving, through the electronic document forgery falsification preventing server, a forgery falsification verification request electronic document transmitted from the user terminal and identifying whether a digital signature for the forgery falsification verification request electronic document is used;

(e") extracting, through the electronic document forgery falsification preventing server, text and text location information, and an image and image location information by analyzing content of the forgery falsification verification request electronic document when identifying that verification of the digital signature for the forgery falsification verification request electronic document fails or that the digital signature is unused at the step (d");

(f") generating, through the electronic document forgery falsification preventing server, forgery falsification verification data by using at least one piece of information of the text and the text location information, and the image and the image location information that are extracted at the step (e");

(g") decoding, through the electronic document forgery falsification preventing server, the original forgery falsification verification data encrypted in the secure original electronic document relevant to the forgery falsification verification request electronic document at the step (c");

(h") comparing, through the electronic document forgery falsification preventing server, the original forgery falsification verification data decoded at the step (g") with the forgery falsification verification data generated at the step (f'); and (i") indicating, through the electronic document forgery falsification preventing server, a forgery falsification location in the forgery falsification verification request electronic document received at the step (d") when the original forgery falsification verification data decoded at the step (g") is different from the forgery falsification verification data generated at the step (f') as a comparison result of the step (h"), and transmitting the forgery falsification verification request electronic document to the user terminal.

16. The method of claim 15, wherein at the step (a"), when extracting the image by analyzing content of the original electronic document received from the user terminal through the electronic document forgery falsification preventing server, hash information of the image is also extracted.

17. The method of claim 15, wherein at the step (c"), when a digital signature is applied to the generated secure original electronic document through the electronic document forgery falsification preventing server, the digital signature that is preset is inserted in the generated secure original electronic document so as to generate a final secure original electronic document.

18. The method of claim 15, wherein at the step (a"), through the electronic document forgery falsification preventing server, at least one original electronic document transmitted from the user terminal is received, and individual-page hash value information, the text and the text location information, and the image and the image location information are extracted by analyzing the original electronic document, and at the step (b"), through the electronic document forgery falsification preventing server, the original forgery falsification verification data is generated by using at least one piece of information of the individual-page hash value information, the text and the text location information, and the image and the image location information that are extracted at the step (a").

19. The method of claim 15, wherein at the step (e"), through the electronic document forgery falsification preventing server, individual-page hash value information is extracted by analyzing individual-page information of the forgery falsification verification request electronic document, and the text and the text location information, and the image and the image location information are extracted by analyzing the content of the forgery falsification verification request electronic document, when identifying that verification of the digital signature for the forgery falsification verification request electronic document fails or that the digital signature is unused at the step (d");

at the step (f'), through the electronic document forgery falsification preventing server, the forgery falsification verification data is generated by using at least one piece of information of the text and the text location information, the image and the image location information, and the individual-page hash value information that are extracted at the step (e"); and at the step (i"), when the original forgery falsification verification data decoded at the step (g") is different from the individual-page hash value information of the forgery falsification verification data generated at the step (f') as the comparison result of the step (h"), whether the original forgery falsification verification data decoded at the step (g") is same as the text and the text location information, and the image and the image location information of the forgery falsification verification data generated at the step (f') is determined, and when the original forgery falsification verification data decoded at the step (g") is different from the text and the text location information, and the image and the image location information of the forgery falsification verification data generated at the step (f'), the forgery falsification location is indicated in the forgery falsification verification request electronic document and the forgery falsification verification request electronic document is transmitted to the user terminal.

20. A non-transitory computer-readable recording medium having a program recorded thereon, the program enabling to be executed by a computer a method of preventing forgery or falsification of an electronic document based on content, the method comprising (a) receiving at least one original electronic document;
(b) extracting text and text location information by analyzing content of the original electronic document received at the step (a);
(c) extracting an image and image location information by analyzing the content of the original electronic document received at the step (a);
(d) generating original forgery falsification verification data by using at least one piece of information of the text and the text location information extracted at the step (b) and the image and the image location information extracted at the step (c);
(e) generating a secure original electronic document after encrypting the original forgery falsification verification data generated at the step (d) and inserting the encrypted original forgery falsification verification data in a preset position of the original electronic document received at the step (a);
(f) receiving a forgery falsification verification request electronic document and identifying whether a digital signature for the forgery falsification verification request electronic document is used;
(g) extracting text and text location information, and an image and image location information by analyzing content of the forgery falsification verification request electronic document when identifying that verification of the digital signature for the forgery falsification verification request electronic document fails or that the digital signature is unused at the step (f);
(h) generating forgery falsification verification data by using at least one piece of information of the text and the text location information, and the image and the image location information that are extracted at the step (g);
(i) decoding the original forgery falsification verification data encrypted in the secure original electronic document relevant to the forgery falsification verification request electronic document at the step (e);
(j) comparing the original forgery falsification verification data decoded at the step (i) with the forgery falsification verification data generated at the step (h); and
(k) indicating a forgery falsification location in the forgery falsification verification request electronic document received at the step (f), when the original forgery falsification verification data decoded at the step (i) is different from the forgery falsification verification data generated at the step (h) as a comparison result of the step (j).

21. A non-transitory computer-readable recording medium having a program recorded thereon, the program enabling to be executed by a computer a method of preventing forgery or falsification of an electronic document based on content, wherein the method uses a system including at least one user terminal and an electronic document forgery falsification preventing server that are connected to each other through a communications network, the method comprising:

(a") receiving, through the electronic document forgery falsification preventing server, at least one original electronic document transmitted from the user terminal, and extracting text and text location information, and an image and image location information by analyzing the original electronic document;

(b") generating, through the electronic document forgery falsification preventing server, original forgery falsification verification data by using at least one piece of information of the text and the text location information, and the image and the image location information that are extracted at the step (a");

(c") generating, through the electronic document forgery falsification preventing server, a secure original electronic document after encrypting the original forgery falsification verification data generated at the step (b") and inserting the encrypted original forgery falsification verification data in a preset position of the original electronic document;

(d") receiving, through the electronic document forgery falsification preventing server, a forgery falsification verification request electronic document transmitted from the user terminal and identifying whether a digital signature for the forgery falsification verification request electronic document is used;

(e") extracting, through the electronic document forgery falsification preventing server, text and text location information, and an image and image location information by analyzing content of the forgery falsification verification request electronic document when identifying that verification of the digital signature for the forgery falsification verification request electronic document fails or that the digital signature is unused at the step (d");

(f") generating, through the electronic document forgery falsification preventing server, forgery falsification verification data by using at least one piece of information of the text and the text location information, and the image and the image location information that are extracted at the step (e");

(g") decoding, through the electronic document forgery falsification preventing server, the original forgery falsification verification data encrypted in the secure original electronic document relevant to the forgery falsification verification request electronic document at the step (c");

(h") comparing, through the electronic document forgery falsification preventing server, the original forgery falsification verification data decoded at the step (g") with the forgery falsification verification data generated at the step (f"); and (i") indicating, through the electronic document forgery falsification preventing server, a forgery falsification location in the forgery falsification verification request electronic document received at the step (d") when the original forgery falsification verification data decoded at the step (g") is different from the forgery falsification verification data generated at the step (f") as a comparison result of the step (h"), and transmitting the forgery falsification verification request electronic document to the user terminal.

* * * * *